(12) United States Patent
Sharma et al.

(10) Patent No.: US 12,450,082 B2
(45) Date of Patent: *Oct. 21, 2025

(54) MANAGING STORAGE DOMAINS, SERVICE TIERS, AND FAILED SERVERS

(71) Applicant: Dell Products L.P., Round Rock, TX (US)

(72) Inventors: Anurag Sharma, Cedar Park, TX (US); Chegu Vinod, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 675 days.

This patent is subject to a terminal disclaimer.

(21) Appl. No.: 17/705,551

(22) Filed: Mar. 28, 2022

(65) Prior Publication Data

US 2023/0305876 A1 Sep. 28, 2023

(51) Int. Cl.

| G06F 11/00 | (2006.01) |
| G06F 9/445 | (2018.01) |
| G06F 9/455 | (2018.01) |
| G06F 9/50 | (2006.01) |
| G06F 11/07 | (2006.01) |

(52) U.S. Cl.
CPC ...... *G06F 9/45558* (2013.01); *G06F 9/44505* (2013.01); *G06F 9/5077* (2013.01); *G06F 11/0727* (2013.01); *G06F 2009/4557* (2013.01); *G06F 2009/45579* (2013.01)

(58) Field of Classification Search
CPC . G06F 11/0727; G06F 11/0793; G06F 11/092
See application file for complete search history.

(56) References Cited

U.S. PATENT DOCUMENTS

2019/0334983 A1 * 10/2019 Largman ............. H04L 41/0668

* cited by examiner

*Primary Examiner* — Katherine Lin
(74) *Attorney, Agent, or Firm* — Dergosits & Noah LLP; Todd A. Noah

(57) ABSTRACT

A system detects a failed server in a cluster of servers, which are controlled by a master node to execute applications and store data, in service tiers, which correspond to sets of server performance characteristics, in storage domains, which correspond to server racks, in the cluster of servers. By accessing a cluster database, the system identifies applications installed on the failed server and any affinities that the identified applications have for any type of server, any service tier, and/or any storage domain. The system uses the cluster's current configuration to update the identified affinities for the identified applications. After the updated affinities for the identified applications is provided to the cluster database, a master node is enabled to identify replacement server(s), for the identified applications, and install the identified applications in the identified replacement server(s), thereby enabling the replacement server(s) to substitute for the failed server and store data.

20 Claims, 23 Drawing Sheets

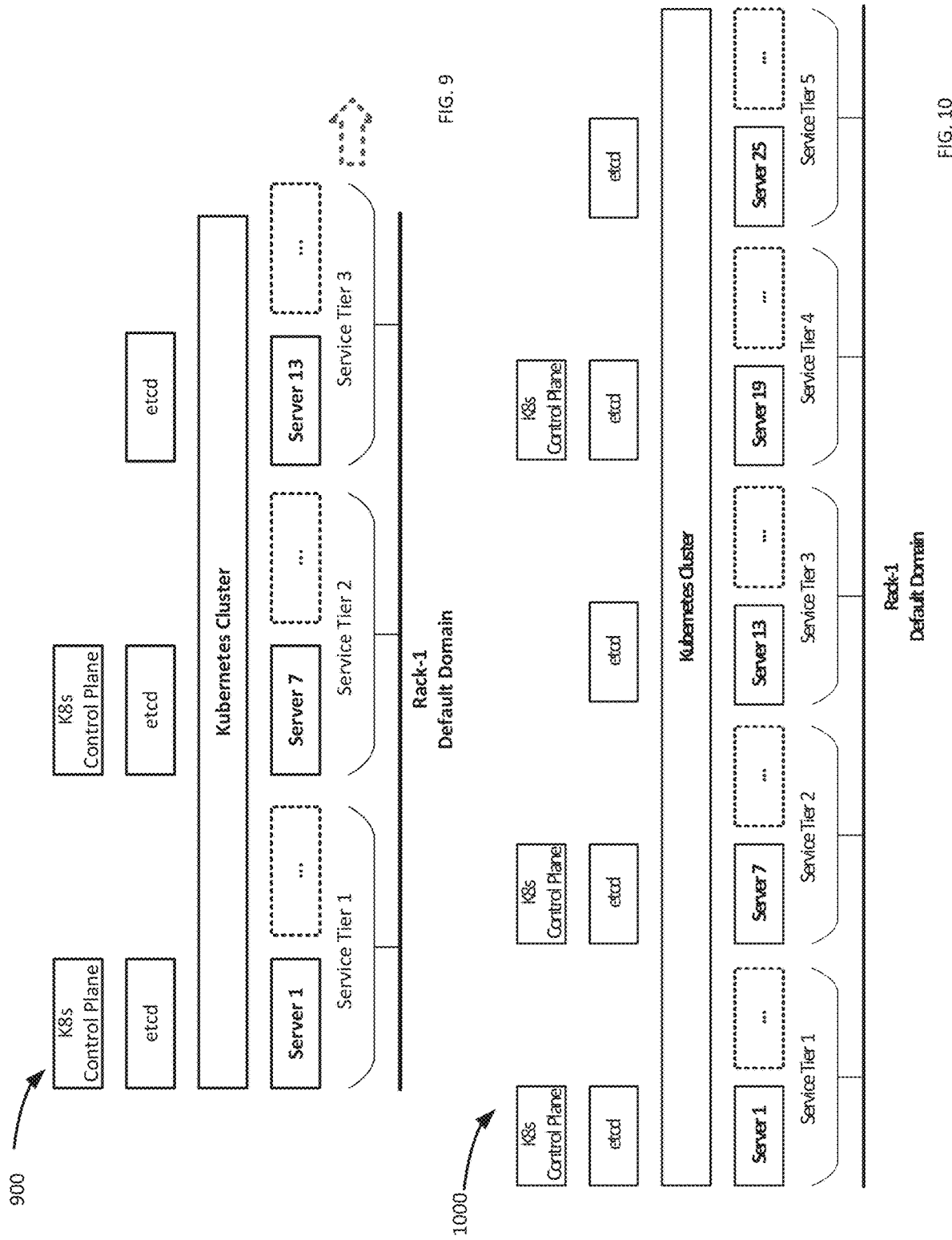

1400

```
apiVersion: apiextensions.k8s.io/v1
kind: CustomResourceDefinition
metadata:
  name: servers.dpa.example.com
  annotations:
spec:
  group: dpa.example.com
  versions:
    - name: v1alpha1
      served: true
      storage: true
      schema:
        # schema used for validation
        openAPIV3Schema:
          type: object
          properties:
            spec:
              type: object
              properties:
                name:
                  type: string
                managementIP:
                  type: string
                rack:
                  type: string
                unit:
                  type: string
                tags:
                  type: string
                compute:
                  type: object
                  properties:
                    model:
                      type: string
                    cores:
                      type: integer
                    memory:
                      type: integer
                storage:
                  type: object
                  properties:
                    media:
                      type: string
                    capacity:
                      type: string
                    count:
                      type: integer
                network:
                  type: object
                  properties:
                    vendor:
                      type: string
                    speed:
                      type: string
                    count:
                      type: integer
                accelerators:
                  type: array
                  items:
                    type: object
                    properties:
                      name:
                        type: string
                      vendor:
                        type: string
                      count:
                        type: integer
            status:
              type: object
              properties:
                state:
                  type: string
  names:
    kind: server
    plural: servers
  scope: Namespaced
```

```
apiVersion: apiextensions.k8s.io/v1
kind: CustomResourceDefinition
metadata:
  name: serverpools.dpa.example.com
  annotations:
spec:
  group: dpa.example.com
  versions:
    - name: v1alpha1
      served: true
      storage: true
      schema:
        # schema used for validation
        openAPIV3Schema:
          type: object
          properties:
            spec:
              type: object
              properties:
                poolName:
                  type: string
                servers:
                  type: array
                  items:
                    type: string
            status:
              type: object
              properties:
                state:
                  type: string
  names:
    kind: serverpool
    plural: serverpools
  scope: Namespaced
```

FIG. 15

1600 

```
apiVersion: apiextensions.k8s.io/v1
kind: CustomResourceDefinition
metadata:
  name: storagedomains.dpa.example.com
  annotations:
spec:
  group: dpa.example.com
  versions:
    - name: v1alpha1
      served: true
      storage: true
      schema:
        # schema used for validation
        openAPIV3Schema:
          type: object
          properties:
            spec:
              type: object
              properties:
                domainName:
                  type: string
                rackNumber:
                  type: integer
                serviceTiers:
                  type: array
                  items:
                    tierName:
                      type: string
                    serverPool:
                      type: string
                    performanceSLA:
                      type: object
                      properties:
                      backupRate:
                        type: string
                      restoreRate:
                        type: string
            status:
              type: object
              properties:
                state:
                  type: string
  names:
    kind: storagedomain
    plural: storagedomains
  scope: Namespaced
```

```
apiVersion: dpa.example.com/v1alpha1
kind: server
metadata:
  name: server_1
spec:
  name: server_1
  managementIP: 192.168.1.101
  rack: 1
  unit: RU01
  compute:
    model: Dell-PowerEdge-R740
    cores: 64
    memory: 32TB
  storage:
    media: 2.5HDD
    capacity: 1.4TB
    count: 16
  network:
    vendor: Mellanox
    speed: 25GBe
    count: 4
  accelerators:
    - QAT:
        vendor: Intel
        name: QAT
        count: 1
```

```
apiVersion: dpa.example.com/v1alpha1
kind: serverPool
metadata:
  name: pool_1
spec:
  poolName: pool_1
  servers:
    - server_1
    - server_2
    - server_3
```

```
apiVersion: dpa.example.com/v1alpha1
kind: storageDomain
metadata:
  name: domain_1
spec:
  domainName: domain_1
  rack: 1
  serviceTiers:
    - Tier1:
        name: Tier1
        serverPool: pool_1
        performanceSLA:
          backupRate: 500MBps
          restoreRate: 200MBps

- Tier2:
        name: Tier2
        serverPool: pool_2
        performanceSLA:
          backupRate: 1000MBps
          restoreRate: 400MBps

- Tier3:
        name: Tier3
        serverPool: pool_3
        performanceSLA:
          backupRate: 1500MBps
          restoreRate: 700MBps
```

```
$ kubectl apply -f storageDomainDefinition.yaml

UpdateStorageDomains(storageDomains)
Begin
  // Get all servers across tiers and domains
  For domain in storageDomains:
    For serviceTier in domain.serviceTiers:
      servers = Union(serviceTier.serverPool.servers)
    End
  End // Bootstrap all servers to K8s node
  For server in servers:
    [Bootstrap OS to meet K8s runtime requirements]
    [Configure certificates and security to meet K8s requirements]
    [Install K8s runtime on each server to make them K8s nodes]
  End cpNodes = storageDomains.length
  If cpNodes < 3 then
    cpNodes = 3
  End
  If (cpNodes % 2) == 0 then
    cpNodes++
  End
  masterNodes = 1 + (cpNodes - 1)/2

// Spread out control-plane across storageDomains
  For domain in storageDomains:
    [Validate if domain is reachable and healthy, skip otherwise]

firstNode = domain.serviceTiers[0].serverPool.servers[0]
    [Label firstNode with role "node-role.kubernetes.io/control-plane"]
    [Install etcd database on firstNode]
    If (masterNodes > 0) then
      [Label firstNode with role "node-role.kubernetes.io/master"]
      [Install K8s control-plane services on firstNode]
      masterNodes--
    End
  End // If storageDomains are not enough, designate others nodes from previous
domains to be part of control-plane
  d = 0, t = 0, n = 1
  While (cpNodes > 0) // need more nodes to complete control-plane
    nextNode = storageDomains[d].serviceTiers[t].serverPool.servers[n++]
    If isValide(nextNode) then
      [Label nextNode with role "node-role.kubernetes.io/control-plane"]
      [Install etcd database on nextNode]
      cpNodes--
```

FIG. 20A

```
2000
      If (masterNodes > 0) then // need more nodes to complete masters
         [Label nextNode with role "node-role.kubernetes.io/master"]
         [Install K8s control-plane services on nextNode]
         masterNodes--
      End
    Else
      [Iterate through servers across tiers and domains to find next valid
node]
    End
  End While (masterNodes > 0) // need more nodes to complete masters
     nextNode = storageDomains[0].serviceTiers[0].serverPool.servers[next++]
     If isValide(nextNode) then
        [Label nextNode with role "node-role.kubernetes.io/master"]
        [Install K8s control-plane services on nextNode]
        masterNodes--
     Else
        [Iterate through servers across tiers and domains to find next valid
node]
     End
  End For domain in storageDomains:
     Call CreateStorageDomain(domain)
  End
End CreateStorageDomain(storageDomain)
Begin
   [Validate storageDomain is bound to a single rack]

For serviceTier in storageDomain.serviceTiers:
      Call CreateServiceTier(storageDomain.domainName, storageDomain.rack,
serviceTier)
   End

[Update database records with storageDomain definition]
End

CreateServiceTier(domainName, rack, serviceTier)
Begin
   [Validate serviceTier.serverPool is bound at rack level]
   [Validate serviceTier.PerformanceSLA can be met with server HW in the
serverPool]

For server in serviceTier.serverPool.servers:
      [Update label of server representing K8s node with serviceTier.Name]
      [Update label of server representing K8s node with domainName]
   End

[Update database records with serviceTier definition]
End
```

FIG. 20B

```
2100 apiVersion: v1
kind: Pod
metadata:
  name: app1
  annotations:
    dpa.example.com/affinity: cluster | serviceTier | storageDomain | global
    dpa.example.com/haStrategy: quorum | redundancy
spec:
  replicas: 2
  containers:
    -name: nginx
    -image: nginx
  nodeSelector:
    serviceTier: Tier3
    storageDomain: Default
```

For app in HelmChart:
  [Examine pod/deployment manifest]
  [Process StorageDomain annotation to determine affinity type]

Switch (affinity):
    Case "cluster":
      If HA strategy = quorum then
        replicas = Count(storageDomains) * 2 + 1
      Else If HA strategy = redundancy then
        replicas = Count(storageDomains) + 1
      Else
        replicas = Count(storageDomains)
      [update replicas attribute of pod manifest]

Case "serviceTier":
      replicas = Count(serviceTiers) * Count(storageDomains)
      [update replicas attribute of pod manifest]

Case "storageDomain":
      replicas = Count(storageDomains)
      [update replicas attribute of pod manifest]

Default:
      //no-op
  End

[update nodeSelector attribute of pod manifest to match node labels]
  [upgrade app using Helm operator - this will recreate pod/deployment objects]

End
```

FIG. 22

# MANAGING STORAGE DOMAINS, SERVICE TIERS, AND FAILED SERVERS

BACKGROUND

A data object may be a set of information that is backed up as a unit. If a software error corrupts a data object, or if erroneous data updates the data object, a data protection administrator may restore the data object to a previous state that does not include the corrupted or erroneous data. A backup/restore application executes a backup operation either occasionally or continuously to enable this restoration, storing a copy of each desired data object state (such as the values of the data object and the embedding of these values in a database's data structures) within dedicated backup files. When the data protection administrator decides to reinstate the data object to a previous state, the data protection administrator specifies the desired previous state by identifying a desired time when the data object was in this previous state, and then instructs the backup/restore application to execute a restore operation to restore a copy of the corresponding backup file(s) for that previous state to the data object.

Secondary storage data platforms, such as PowerProtect Data Domain, are challenged with ever growing security and availability constraints combined with performance objectives, which are often defined by service level agreements. These challenges are not just limited to secondary storage data platforms, but also apply to other storage solutions, such as Elastic Cloud Storage's Object Storage and Hyper-Converged Infrastructure solutions. FIG. 1 illustrates a diagram of an example system 100 for a secondary storage data platform, in which a backup (and restore) application 102 can create backup files for data objects generated by enterprise applications 104 in a client device 106, and can store the backup files on a primary data storage platform, such as a primary data domain system 108, which then can replicate the backup files to a secondary data storage platform, such as a disaster recovery data domain system 110. One way for such a distributed system to achieve higher availability is by running countless copies, or replicas, of its services distributed across geographies. This means that the distributed system has to address problems such as keeping a large number of servers up to date with the latest operating system patches, ensuring that these servers are all running the correct version of the distributed system's services, preventing configuration drift across all the servers, orchestrating rollouts of new code and configurations, and handling network partitions between servers.

BRIEF DESCRIPTION OF THE DRAWINGS

FIG. 9 illustrates a block diagram of an example storage data platform which includes a default storage domain which has at least three service tiers for a framework for managing the infrastructure for storage domains and service tiers, under an embodiment;

FIG. 10 illustrates a block diagram of an example storage data platform which includes a default storage domain which has at least five service tiers for a framework for managing the infrastructure for storage domains and service tiers, under an embodiment;

FIG. 14 illustrates an example custom resource definition for a server for a framework for managing the infrastructure for storage domains and service tiers, under an embodiment;

FIG. 15 illustrates an example custom resource definition for server pools for a framework for managing the infrastructure for storage domains and service tiers, under an embodiment;

FIG. 16 illustrates an example custom resource definition for storage domains with service tiers for a framework for managing the infrastructure for storage domains and service tiers, under an embodiment;

FIG. 17 illustrates an example custom object that represents an instantiation of a server for a framework for managing the infrastructure for storage domains and service tiers, under an embodiment;

FIG. 18 illustrates an example custom object that represents an instantiation of a server pool for a framework for managing the infrastructure for storage domains and service tiers, under an embodiment;

FIG. 19 illustrates an example custom object that represents an instantiation of a storage domain for a framework for managing the infrastructure for storage domains and service tiers, under an embodiment;

FIG. 20A and FIG. 20B illustrate example code snippets which illustrate how labels are applied to servers using a Kubernetes command line interface for a framework for managing the infrastructure for storage domains and service tiers, under an embodiment;

FIG. 21 illustrates an example custom object that represents an instantiation of a pod for a framework for managing the infrastructure for storage domains and service tiers, under an embodiment;

FIG. 22 illustrates an example custom object that represents an instantiation of a pod affinity for a framework for managing the infrastructure for storage domains and service tiers, under an embodiment;

DETAILED DESCRIPTION

Figure 1:
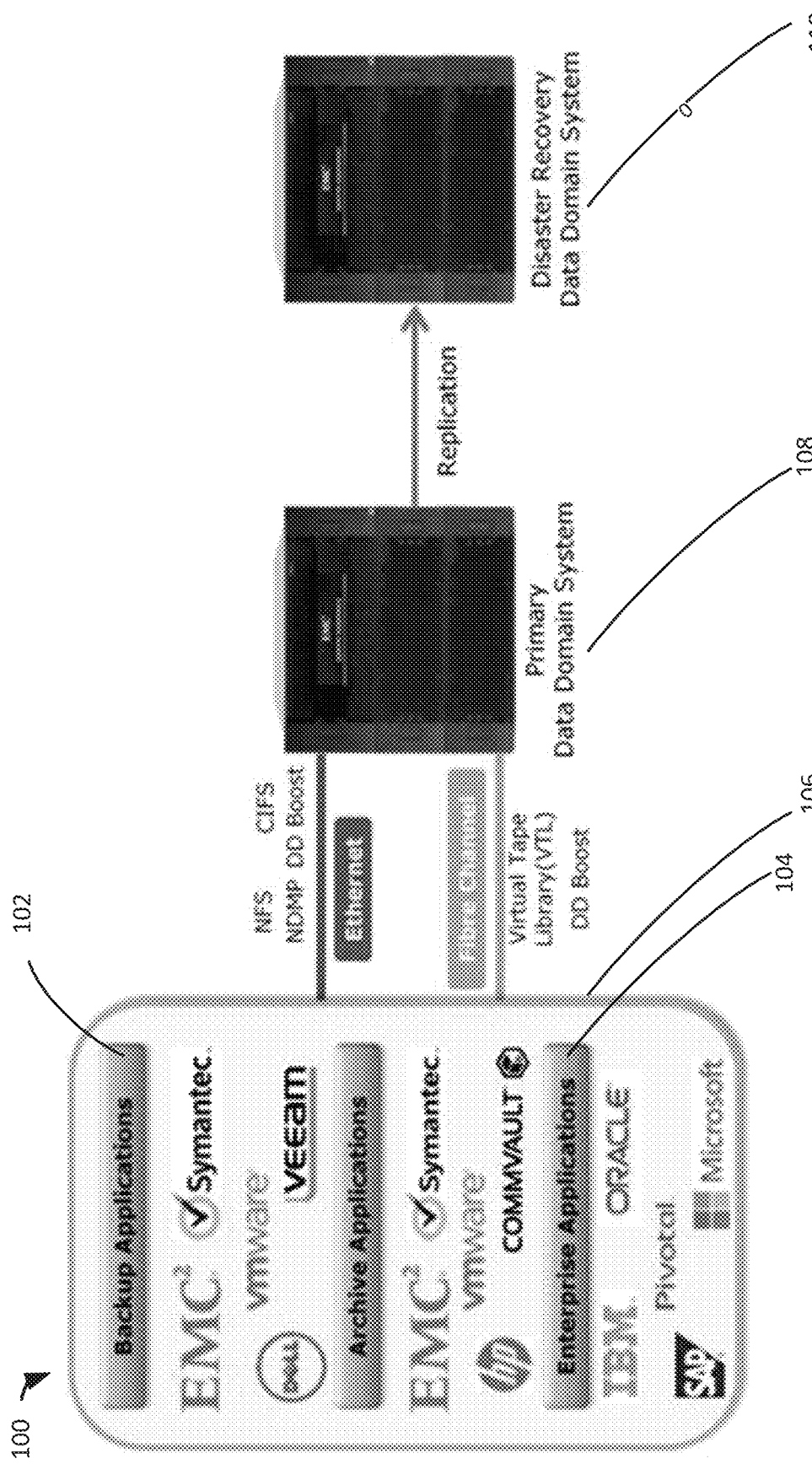
FIG. 1 illustrates a diagram of an example system which includes a secondary storage data platform.

When an enterprise's existing secondary storage data platform approaches its storage capacity, the enterprise can purchase a new secondary storage data platform. Alternatively, the enterprise can extend the capacity of the existing secondary storage data platform by adding additional servers to the enterprise's existing severs which host the enterprise's archive data, partitioning this cluster of servers into multiple storage domains, and using each of these storage domains for different business units or class of data, such as for an enterprise's marketing, sales, and customer services departments. Each storage domain may be configured with its own service level agreements for performance which are defined in terms of service tiers, such as throughput for backup and restore, measured in megabytes per second, input/output operations per second for instant access and instant restore, and different availability characteristics.

If servers are grouped into storage domains on different server racks, then the failure of a storage domain does not impact any other storage domains. An enterprise's data archived in a storage domain would not be available for access from the enterprise's other storage domains. Deduplication would occur within the context of each storage domain. Providers of multi-tenant systems requiring true physical separation may consider creating storage domains, however this is not the primary purpose for creating storage domains.

Embodiments herein enable a framework for managing the infrastructure for storage domains and service tiers. A system can receive specifications for creating storage domains which include service tiers, and allocate servers for each service tier in each storage domain in a cluster. The system can create a cluster database by installing a database application in at least three servers in the storage domains.

The system can create a master node by installing a container control services application in at least two servers in each storage domain. The system can prepare the service tiers for operation by installing a tier services application in at least one server in each service tier. The system can prepare the storage domains for operation by installing a domain services application in at least one server in each storage domain. The system can combine each allocated server into a cluster of servers.

The system detects a failed server in the cluster of servers, which are controlled by a master node which executes applications and store data in service tiers, which correspond to sets of server performance characteristics, in storage domains, which correspond to server racks, in the cluster of servers. By accessing a cluster database, the system identifies applications installed on the failed server and any affinities that the identified applications have for any type of server, any of the service tiers, and/or any of the storage domains. The system uses a current configuration of the cluster to update the identified affinities for the identified applications. By retrieving the updated affinities for the identified applications from the cluster database, a master node is enabled to identify at least one replacement server, for the identified applications, and install the identified applications in the at least one replacement server, thereby enabling the at least one replacement server to substitute for the failed server and store data.

For example, a framework's Storage Domain Management Controller can receive three storage domain specifications from a user. The Storage Domain Management Controller can parse the three specifications for creating the storage domains A, B, and C, which correspond to server racks 1, 2, and 3, respectively, identify two service tiers of hard disk drives and solid-state drives for each of the three storage domains A, B, and C, and identify six servers for each of the six service tiers, which results in allocating the required number of 36 servers for the three domains A, B, and C. The Storage Domain Management Controller can identify the applications to be installed in the 36 servers from the specifications, retrieve the identified applications from an Application Management Controller's application inventory, and request the framework's Pod Affinity Rule Controller to identify the affinity types and the high availability strategy for each retrieved application. The framework's Cluster Management Controller can install an etcd database in three servers which correspond to storage domain A, storage domain B, and storage domain C. The Cluster Management Controller can install a Kubernetes control plane in a server in storage domain A and a server in storage domain B.

The Storage Domain Management Controller can label six servers with hard disk drives and six servers with solid-state drives in server rack one with the labels of service tier 1 and service tier 2 for the storage domain A, six servers with hard disk drives and six servers with solid-state drives in server rack 2 with the labels of service tier 1 and service tier 2 for the storage domain B, and six servers with hard disk drives and six servers with solid-state drives in server rack 3 with the labels of service tier 1 and service tier 2 for the storage domain C. The Storage Domain Management Controller can identify the six servers for each of the six service tiers based on the servers' characteristics, and apply the appropriate service tier labels to the 36 servers. Then the Storage Domain Management Controller can identify each server that has a service tier label, and prepare the service tiers for operation by installing a tier services application in a server in each service tier, thereby creating the six service tiers specified by the three domain specifications.

The Storage Domain Management Controller can apply the three different storage domain labels to the allocated servers. Later, the Storage Domain Management Controller can use each server's storage domain label to identify a server for each storage domain and install a domain services application in these identified servers, thereby creating the three storage domains A, B, and C, as specified by the three domain specifications. The Cluster Management Controller can join the 36 servers to form a Kubernetes cluster, and the Storage Domain Management Controller can deploy the three storage domains A, B, and C, which include multiple service tiers and applications for the user.

The framework's Inventory Management Controller uses an automatic discovery process to quickly detect the failure of server 7 to communicate, and sends this event to the Kubernetes event stream to notify other controllers, including the framework's Application Management Controller. The Application Management Controller responds to the failure of server 7 by using an API server to query an active etcd database and identify that a Kubernetes control plane and an etcd database application were both installed on the failed server 7, and have affinities for servers with solid-state drives and storage domain A. The Application Management Controller determines from affinity rules that both the Kubernetes control plane and the etcd database application should not be installed on the same server in a service tier when the service tier has five or more servers, Therefore, the Application Management Controller updates these affinities to indicate that the Kubernetes control plane and the etcd database application still have an affinity for servers with solid-state drives, and for the storage domain A, and adds a taint for each of the Kubernetes control plane and the etcd database application to not be installed on a server that has already installed the other application. The Application Management Controller uses the API server to update these affinities in an active etcd database, which enables a master node, which detected the failure of the server 7, to read the etcd database and identify the updated affinities for the Kubernetes control plane and the etcd database.

Then the master node identifies server 13 as a replacement server for the failed server 7 since both servers 7 and 13 are in the service tier 2 for solid-state drives in the storage domain A. Additionally, the master node identifies server 14 as another replacement server for the failed server 7 since both servers 7 and 14 are in the service tier 2 for solid-state drives in the storage domain A, and because the taint between the Kubernetes control plane and the etcd database application will not tolerate both of these applications being installed on server 13. Therefore, this master node installs the control plane in the replacement server 13 and the etcd database application in the replacement server 14, thereby reestablishing the six service tiers specified by the three specifications for the storage domains A, B, and C, so that the replacement servers 13 and 14 store data in the service tier 2 in the storage domain A which were used by the failed server 7 for storing data.

Figure 2:
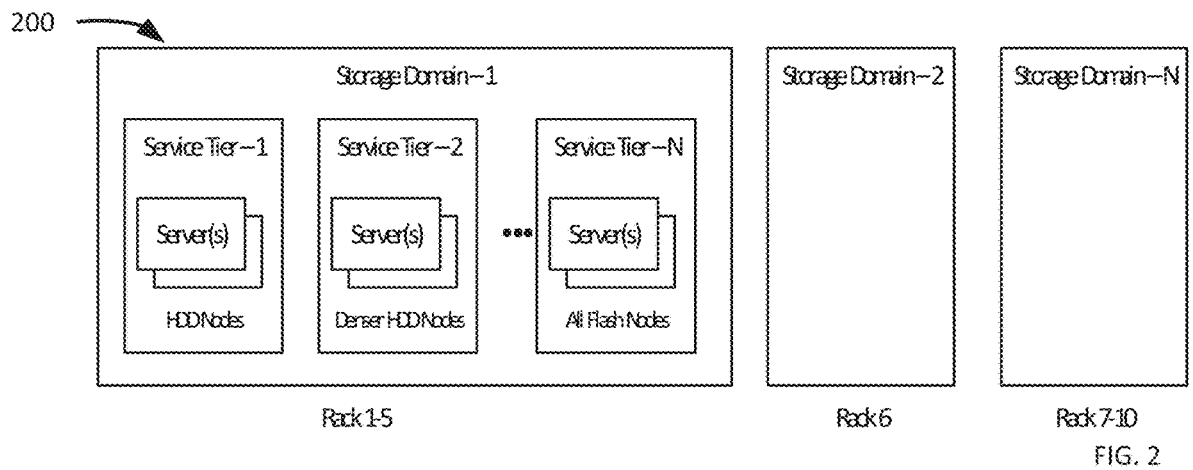
FIG. 2 illustrates a block diagram of an example multi-rack cluster of servers which are partitioned into storage domains.

For an example of a system which uses storage domains which include service tiers, FIG. 2: depicts a multi-rack cluster of servers 200 which are partitioned into storage domain 1, which includes servers in server racks 1-5, storage domain 2, which includes servers in server rack 6, and storage domain N, which includes severs in server racks 7-10. Storage domain 1 includes servers with hard disk drive (HDD) that are in service tier 1, servers with denser hard disk drive that are in service tier 2, and servers with flash drives that are in service tier N. When ordering a new data platform, an enterprise can specify the logical storage capacity in terabytes (TB) or petabytes (PB), the number of service tiers and the number of storage domains. When extending an existing data platform, an enterprise can reconfigure existing storage domains and service tiers or add more servers to create more storage domains with more service tiers.

A framework for managing the infrastructure for storage domains and service tiers can efficiently configure or reconfigure a data platform into multiple storage domains, each with multiple service tiers, without risking the availability of the hosting cluster of servers or its data. While using a cloud-native architecture running on a Kubernetes (which may be abbreviated as K8s) system to address the requirements of storage domains and service tiers, the Kubernetes system can overcome challenges for the availability and rebalancing of stateful and stateless services running on the Kubernetes system, including Kubernetes control plane services, as storage domains and/or service tiers are added and removed. Even though this Kubernetes system is described in the context of a PowerProtect scale-out, the system can leverage the underlying concepts for other Kubernetes-based options.

The CAP Theorem posits that a stateful distributed system can guarantee at most two of the following properties, Consistency, Availability, and Partition tolerance: Consistency guarantees that every read request is to either receive the most current data or fail. Availability is the ability to continue serving requests without the guarantee that the response contains the most current data. Partition tolerance is resiliency in the event of dropped or degraded network communication between servers. There is no right answer when selecting which CAP properties that a distributed system will guarantee, as any selection involves tradeoffs.

Since Kubernetes is optimized for running resilient and highly available workloads, state updates are propagated over time in what is known as eventual consistency. Eventual consistency means that if no new updates are made to a distributed system, then eventually the data in the servers of the distributed system will converge. This means that eventually all servers will reflect the most current update and be consistent, but there are no guarantees about how long this eventuality will take.

A Kubernetes cluster consists of a set of servers, called worker nodes or nodes, which run containerized applications. Every cluster has at least one worker node. The worker node(s) host pods which are the components of the application workload. A Kubernetes control plane manages the worker nodes and the pods in the cluster.

Figure 3:
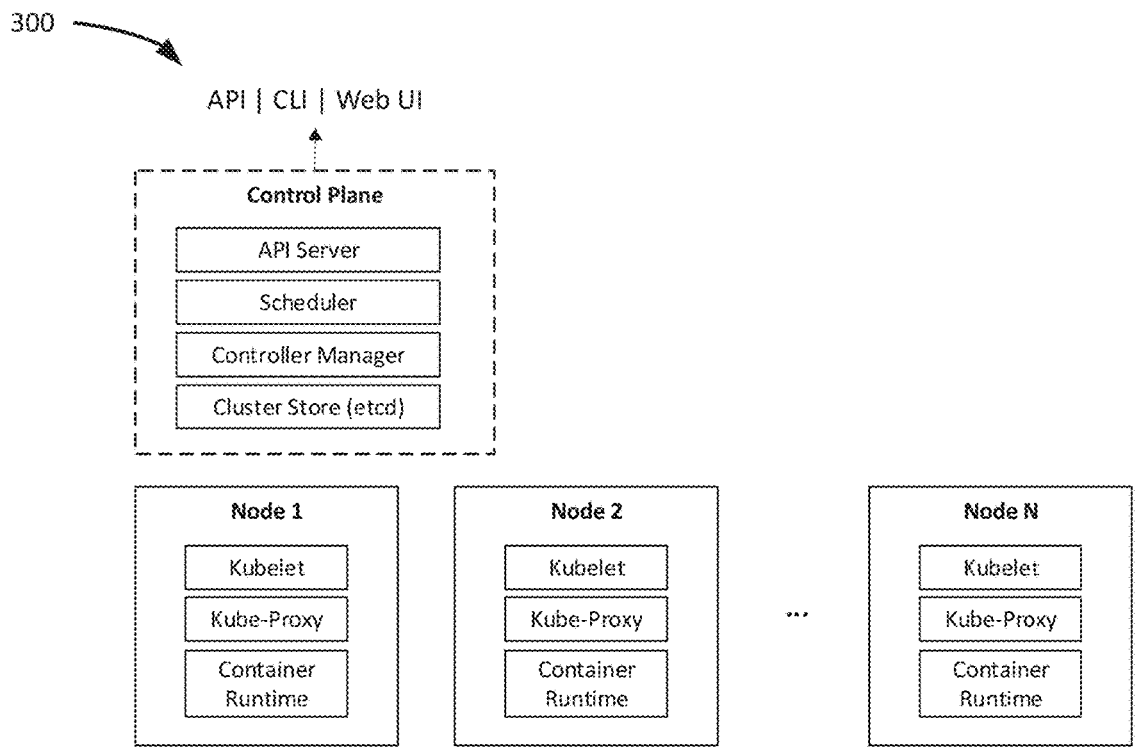
FIG. 3 illustrates a block diagram of an example Kubernetes cluster.

FIG. 3: depicts an example of a Kubernetes cluster 300. A Kubernetes control plane's components make global decisions about the cluster, such as scheduling, as well as detecting and responding to cluster events. The Kubernetes control plane's components may run on any node in the cluster.

The Application Programming Interface (API) server is a component of the Kubernetes control plane which exposes the Kubernetes API. The API server is the front end for the Kubernetes control plane. The cluster store is a consistent and highly available key value store used as Kubernetes' backing store for all cluster data.

The scheduler is a component that watches for newly created pods which lack an assigned node and schedules a node for the pods to run on. Factors considered for scheduling decisions include individual and collective resource requirements, hardware and/or software/policy constraints, affinity and anti-affinity specifications, data locality, inter-workload interference, and deadlines. The controller manager is a component that runs controller processes.

Node components run on every node, maintaining running pods and providing the Kubernetes runtime environment. The kubelet is an agent that runs on each node in the cluster and makes sure that containers are running in a pod. The kube-proxy is a network proxy that runs on each node in a cluster, implementing part of the Kubernetes service concept, and maintains network rules on nodes. These network rules allow network communication to the pods from network sessions from inside or outside of the cluster. The container runtime is the software that is responsible for running containers.

In robotics and automation, a control loop is a non-terminating loop that regulates the state of a system. Kubernetes takes a cloud-native view of systems and is able to handle constant change. A Kubernetes cluster could be changing at any point as work occurs and control loops automatically corrects failures. Kubernetes comes with a set of built-in controllers that run inside the controller manager and provide important core behaviors. A controller tracks at least one Kubernetes resource type.

Kubernetes allows developers to define resources such as containers, pods, services, deployments, replica-set, etc. in the form of a declarative YAML (a human-readable data serialization language) file following the specification of a respective resource type. These objects have a specification field that represents the desired state. The controller(s) for a resource are responsible for making the current state come closer to that desired state. The controller might carry the action out itself; or more commonly in Kubernetes, a controller will send messages to the API server that have useful side effects.

Figure 4:
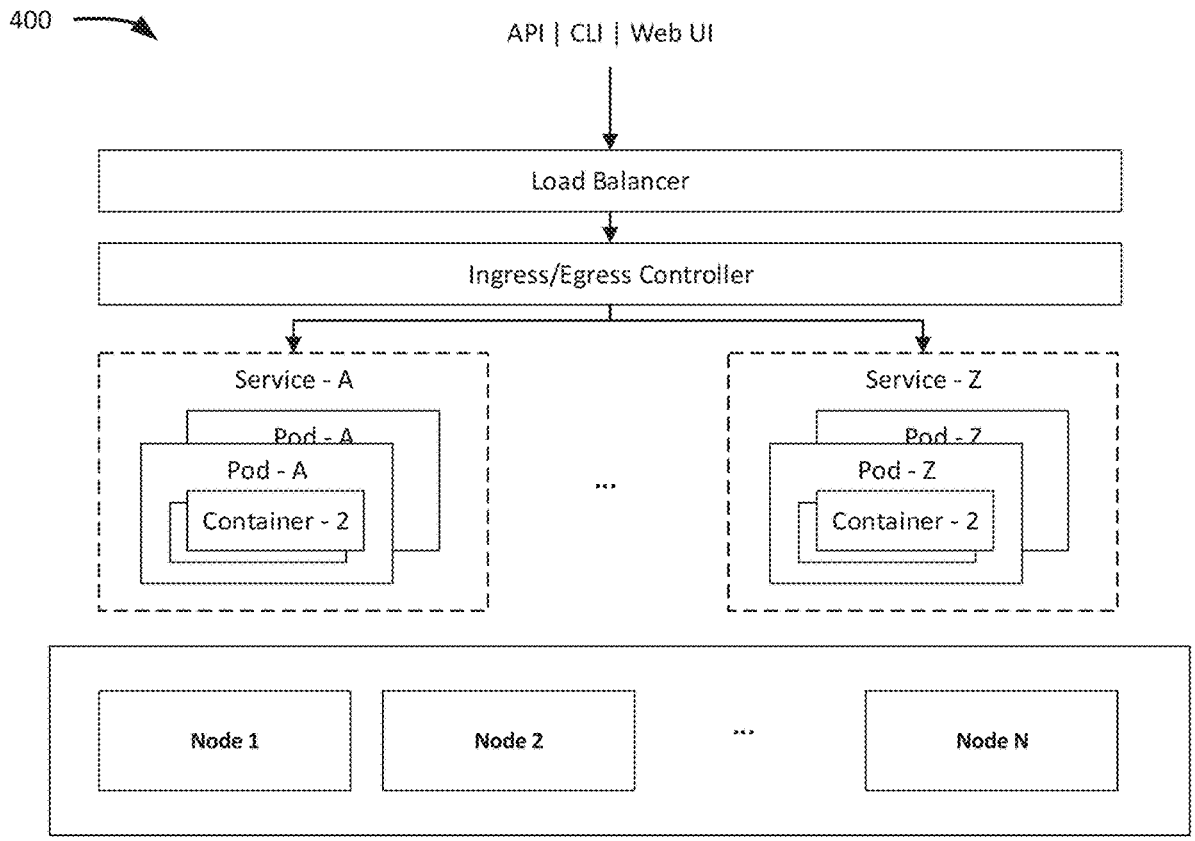
FIG. 4 illustrates a block diagram of an example cloud native application architecture for an application running in a Kubernetes cluster.

FIG. 4 depicts an example cloud native application architecture (Scale-out) of an application running in a Kubernetes cluster 400. A microservice packaged in the form of one or more containers is encapsulated in a Kubernetes pod using pod manifest, a YAML-based specification. A deployment provides declarative updates for pods and replica sets. A user describes a desired state in a deployment, and the deployment controller changes the actual state to the desired state at a controlled rate. Users can define deployments to create new replica sets, or to remove existing deployments and adopt all their resources with new deployments.

Kubernetes provides an API to label nodes and supports multiple labels which may be used for affinities, taints, and tolerances. Node affinity is a property of pods that attracts them to a set of nodes, either as a preference or a hard requirement. Taints are the opposite of node affinity, as they allow a node to repel a set of pods.

Tolerations are applied to pods and allow, but do not require, the pods to schedule on nodes with matching taints. Taints and tolerations work together to ensure that pods are not scheduled on inappropriate nodes, one or more taints may be applied to a node; and mark that the node should not accept any pods that do not tolerate the taints.

Kubernetes has a "hub-and-spoke" API pattern. All API usage from nodes, or the pods they run, terminates at an API server, which is configured to listen for remote connections on a secure HTTPS port, typically port 443. The Kubernetes control plane's components also communicate with the cluster API server over the secure port. There are two primary communication paths from the Kubernetes control plane (API server) to the nodes. The first path is from the API server to the kubelet process which runs on each node in the cluster. The second path is from the API server to any node, pod, or service through the API server's proxy functionality.

A Kubernetes control plane may be extended to add a custom resource by providing specification of a new resource type in the form of custom resource definitions, and by implementing custom controller(s) to process the control loop reconciliation events. Some enterprises provide their software in the form of Kubernetes extensions. For example, Dell Technologies provides Kubernetes extensions for its data protection software to enable backup of Kubernetes application data. The advantage of providing software via Kubernetes extensions is that only custom resource definitions and controllers are implemented and the Kubernetes ecosystem such as API Server are leveraged for exposing a REST (Representational State Transfer) API and a cluster store (etcd) for persistence. Applications developed this way are sometimes referred to as Kubernetes native applications.

Figure 5:
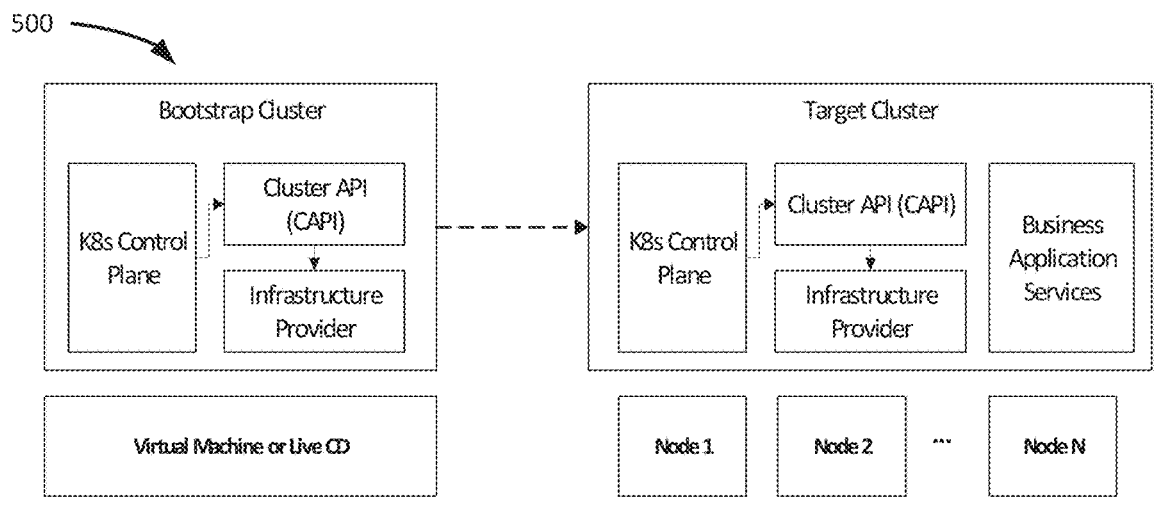
FIG. 5 illustrates a block diagram of an example cluster API framework for cluster lifecycle management.

There is a growing trend to implement everything in a Kubernetes native way, and cluster installation is not an exception. A Cluster API (CAPI) is an extensible framework built using custom resources and controllers to setup a target cluster and then pivot over to the target cluster to provide in-cluster lifecycle management of the target cluster. FIG. 5 depicts an example Cluster API framework 500 for cluster Lifecycle Management (LCM).

A Cluster API framework provides a skeleton of the cluster lifecycle management workflows and expects independent software vendors to hook their own infrastructure provider. There are a number of such providers available, ranging from bare-metal infrastructure providers to cloud infrastructure providers. Each provider's implementation could be different. For example, a bare-metal infrastructure provider's implementation may include discovery of servers, server configuration, boot disk partitioning, operating system installation, network configuration, a Kubernetes control plane installation, and pivot over to target cluster.

For a cloud infrastructure provider, the servers may be pre-configured with an operating system and the provider may only need to install the Kubernetes control plane and pivot over to the target cluster. A Cluster API provides server management experiences that are the same as pod management experiences. That means that a user can add and/or remove servers in Kubernetes native way, just like the user adds and/or remove pods, to maintain the desired state of a cluster.

The high availability deployment of a Kubernetes control plane requires running at least two instances of an API server with load balancing and fail-over capabilities to support a fault tolerance of 1, and an odd number, such as 3, 5, or 7, of etcd databases to support fault tolerances, such as 1, 2, or 3, respectively. This is because the etcd database's high availability implementation is based on a quorum, and a quorum requires an odd number of nodes to effectively elect the leader. This means that a system needs a minimum of three servers to support the high availability of a cluster with a fault tolerance of one, and a minimum of five servers to support a fault tolerance of two, and so on.

For a cluster size of three servers, the cluster installation requires placing one instance of the etcd database on each server and two instances of an API server on any two servers. The failure of any server will transition the cluster from a high availability state to a degraded state that is still available. Once any faulty servers are replaced, the numbers of the etcd databases instances and the API server instances must be restored to the initial counts to transition the cluster from a degraded state to a high availability state.

To build an integrated storage or data protection appliance using Kubernetes, a cluster may need to be partitioned into logical groups to increase resiliency and fault-tolerance. Storage features such as deduplication, compression, encryption, and erasure coding are defined per service tier and hence cannot span across storage domains. The system uses an extension of a Kubernetes control plane with a set of custom resources to represent servers, storage domains and service tiers, and a set of controllers 600 to automatically detect and respond to the failure of a server, a service tier, or a storage domain by rebalancing the placement of services to maintain the availability of a cluster as well as the consistency of the storage domains and service tiers, as depicted by FIG. 6.

Figure 6:
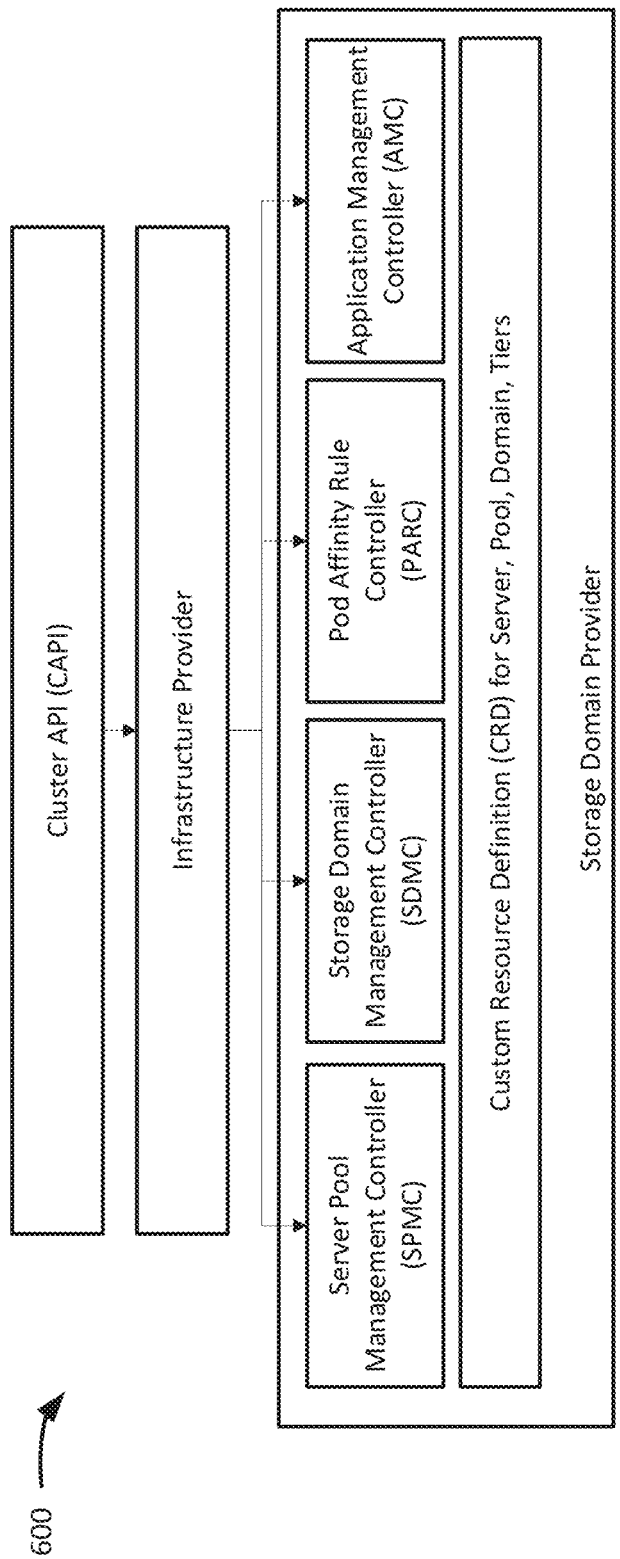
FIG. 6 illustrates a block diagram of example controllers which respond to the failure of a server, a service tier, or a storage domain in a framework for managing the infrastructure for storage domains and service tiers, under an embodiment.

FIG. 6 illustrates an example of a cluster API for cluster management using two providers, an infrastructure provider and a storage domain provider. The major components 600 are designed to implement a framework that enables storage domains, such as an Application Management Controller (AMC), a Server Pool Management Controller (SPMC), a Storage Domain Management Controller (SDMC), a Pod Affinity Rule Controller (PARC), a Cluster Management Controller (CMC), and an Inventory Management Controller (IMC). The Inventory Management Controller is responsible for discovering servers and persisting them into Kubernetes database using the server custom resource definitions model. The Inventory Management Controller detects the addition or the removal of a server through an automatic discovery process and sends an event to the Kubernetes event stream to notify other controllers.

The Server Pool Management Controller provides interfaces for creating, retrieving, updating, and/or deleting a server pool object based on the server pool custom resource definitions model. The Cluster Management Controller is responsible for bootstrapping a Kubernetes cluster and managing the lifecycle of the Kubernetes cluster. When bootstrapping a Kubernetes cluster, the Cluster Management Controller works with the Inventory Management Controller to find server objects, provision the server objects into Kubernetes nodes by installing the operating system, Kubernetes runtime, etc., and group the server objects to form a Kubernetes cluster. For lifecycle management (LCM), the Cluster Management Controller provides non-disruptive upgrade (NDU) of Kubernetes runtime, the addition and/or removal of nodes for the Kubernetes cluster, the maintenance mode of Kubernetes nodes for serviceability purposes, the backup/restore of cluster data/configurations, events/alerts, and health statistics.

The Storage Domain Management Controller is responsible for managing storage domains and their service tiers. The Storage Domain Management Controller provides interfaces for adding or removing storage domains and service tiers based on their respective custom resource definitions models. The Storage Domain Management Controller works with the Cluster Management Controller and the Inventory Management Controller to apply storage domain labels and service tiers labels to the Kubernetes nodes. These labels logically group the Kubernetes nodes into specific storage domains and service tiers.

In a cluster, there could be many servers spread across server racks. More servers could be added to expand a storage domain, and/or a few faulty servers could be replaced to service the servers. More storage domains and service tiers may be added or removed as per the business need. This flexibility requires a strategic placement of the Kubernetes control plane components (the API Server) and an active etcd database to minimize the blast radius and maintain the high availability state of the cluster. This also requires labeling servers with storage domain names and service tier names to logically partition the cluster and enable pods to use affinity rules for their placement into a specific storage domain and/or a specific service tier.

If a customer wants to build a Kubernetes cluster of three or more servers, the Cluster API Provider places one instance of the etcd database on the first three servers and joins them to form a high availability cluster of etcd database instances. If the cluster has only three servers, then the Cluster API Provider places two instances of the API server along with a load balancer on the first two servers. If the cluster has more than three servers, then the Cluster API Provider places the two instances of the API server on the next two servers to keep the API server and the etcd database instances on separate servers. These special servers which execute Kubernetes control plane components may be referred to as master nodes.

After an initial setup of a Kubernetes cluster, the Cluster API provider can invoke the Storage Domain Provider interfaces. The Server Pool Management Controller provides an API to organize servers into multiple server pools using Kubernetes labels. The Cluster API Provider can invoke the Server Pool Management Controller's API to examine the servers' hardware inventory and group these servers based on hard disk drives, solid state drives, acceleration cards, etc. An administrator using a Cluster API interface (API/UI) will have the option to regroup the servers to override the default grouping.

The Storage Domain Management Controller provides an API to organize servers into storage domains and service tiers. The Cluster API Provider can invoke a Storage Domain Management Controller's API to label all servers with the service tier name "Default Tier." The Cluster API Provider can invoke the Storage Domain Management Controller's API to label all servers with the storage domain name "Default Domain." To support the elastic nature of storage domain and service tier expansion and the serviceability of faulty servers, a distributed system needs an automation to continuously monitor and replace Kubernetes control plane components (API Server) and an active etcd database in a strategic manner to minimize the blast radius and maintain the high availability of a cluster. The initial setup should build a Kubernetes cluster which defaults to a single storage domain and single service tier, with a customer having a later option to add more service tiers and storage domains.

FIG. 7-FIG. 13 illustrate example data platforms built using cloud-native architecture running a Kubernetes cluster. A single Kubernetes cluster of servers is spread across server racks and logically partitioned into storage domains and service tiers in a way that the Kubernetes cluster of servers remains available even if a few servers, service tiers, or storage domains become unavailable. Using the quorum-based high availability strategy, the framework can provide a fault tolerance (Faults To Tolerate, or FTT) of one for a data platform with three storage domains, a fault tolerance of two for a data platform with five storage domains, a fault tolerance of three for a data platform with seven storage domains, and so on.

A data platform is composed of cloud-native microservices which could be stateless or stateful, such as Kubernetes cluster services, tier services, domain services, global services, an etcd database, and a Kubernetes control plane. Kubernetes cluster services may be scheduled to run anywhere in the cluster of servers but must maintain a high availability state of the cluster of servers. Tier services are scheduled to run in a specific service tier, and the failure of any service tier should not impact the availability of the other service tiers. Domain services are scheduled to run in a specific storage domain, and the failure of a storage domain should not impact the availability of other storage domains. Global services are scheduled to run anywhere in the cluster of servers but must maintain high availability.

Some stateful services maintain their high availability state by forming a quorum of an odd number of instances. For example, an active etcd database require three instances to support a fault tolerance of one, five instances to support a fault tolerance of two, seven instances to support a fault tolerance of three, and so on. Some services such as a Kubernetes control plane's services maintain its high availability state with a redundant pair deployed as active-active or active-passive, combined with a load balancer to support failover. When a Kubernetes cluster of servers is partitioned into storage domains and services tiers, the cluster requires intelligent rebalancing of these cloud-native microservices to maintain availability while being able to tolerate the maximum number of allowed failures.

A distributed system can execute a set of cloud-native microservices which use a declarative format. A distributed system can intelligently rebalance services within a storage domain for the expansion of service tiers by adding more servers, the definition and/or the redefinition of service tiers, the failure of servers or service tiers, and the serviceability of servers or service tiers through the maintenance mode. A distributed system can intelligently rebalance services across multiple storage domains for the expansion of storage domains by adding more server racks, the definition and/or the redefinition of storage domains, the failure of any server, service tier, or server racks, and the serviceability of a server rack through a maintenance mode. A distributed system can function based on the following assumptions: each storage domain is one or more racks, but all servers from a servers rack may not be used, the same server rack cannot participate in two storage domains, and the expansion of storage domains is based on the increment of two storage domains to tolerate the number of storage domain failures, such as 1, 2, or 3 faults to tolerate, and the server rack to server rack has reliable networking, with each server rack using Top Of Rack (TOR) switches for north-south and east-west networking.

Figure 7:
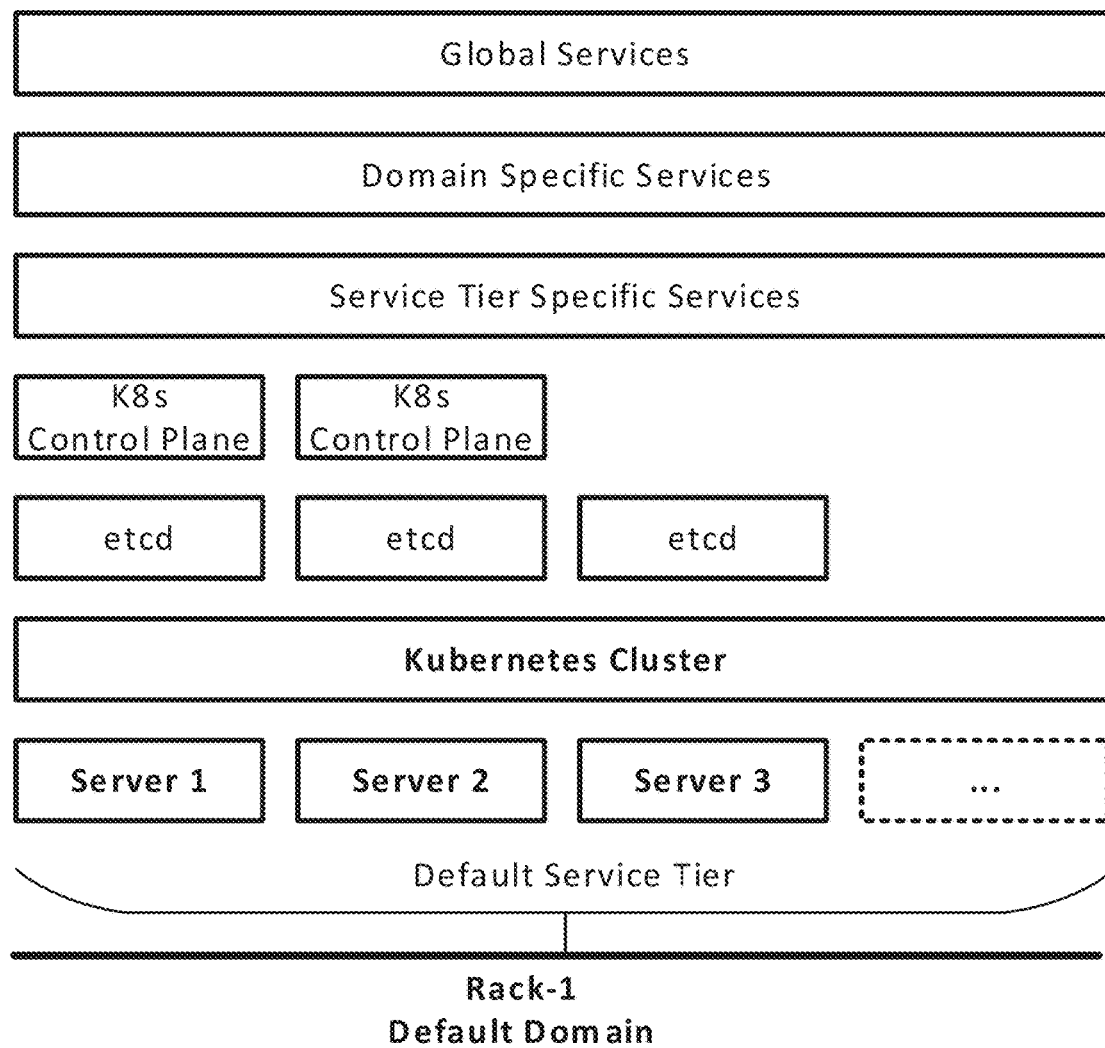
FIG. 7 illustrates a block diagram of an example storage data platform which includes a default storage domain and a default service tier for a framework for managing the infrastructure for storage domains and service tiers, under an embodiment.

FIG. 7 depicts an example storage data platform 700 which includes a default storage domain and a default service tier. This cluster of three or more servers has a fault tolerance of one or more servers, and the default storage domain has no fault tolerances. The storage data platform 700 executes an instance of global services, an instance of domain services, an instance of tier services, an instance of Kubernetes cluster services, and includes two instances of a Kubernetes control plane and three instances of an etcd database.

When instructed to build a Kubernetes cluster of three or more servers, the Cluster API Provider will place an instance of the etcd database on the first three servers and two instances of the API server (with a load balancer) on the first two servers, as depicted in FIG. 7. If one or more servers become unreachable by the Kubernetes control plane's component API Server, the cluster API Provider will get a notification via a control-loop and eject any unreachable servers, which may be referred to as failed servers or faulty servers, from the cluster and drain out faulty servers to ensure that there is no workload running on these faulty servers. The drain operation is performed via an external non-Kubernetes component. The Cluster API server can host an operating system agent via the API, assuming that the operating system is still running and accessible. If the operating system is not running, then it assumed that no workload is running and there is no need to drain the failed server. The Cluster API server can power-off faulty servers using a Dell Remote Access Controller (baseboard management controller) to ensure nothing is running on the failed server.

The failed server alerts are raised to an administrator for serviceability, and server LEDs are set to blinking via a Dell Remote Access Controller to help identify faulty servers. If the ejected servers were part of a master nodes pool, then the distributed system transitions the cluster state from a high availability state to a degraded state. Once an administrator replaces any faulty servers with any new or repaired servers, the administrator can use the Cluster API interface to provision each of these replacement servers by installing an operating system and a Kubernetes runtime and joining the replacement servers in the Kubernetes cluster.

While waiting on an administrator to replace any faulty servers, the Storage Domain Management Controller examines the impact of any failed server on the API servers executing on the master nodes and the cluster database. If the current counts of the etcd database instances and the API server instances are lower than the desired level required (a minimum of three etcd database and a minimum of two API server instances) for high availability, the cluster state is marked as degraded. Then a Storage Domain Management Controller creates additional etcd database instances and Kubernetes control plane instances on healthy servers, if available, and marks these servers as etcd databases and API servers, respectively. When the counts of the etcd database instances and the API server instances return to the desired level, then the cluster state is transitioned from a degraded state to return to a high availability state.

Figure 8:
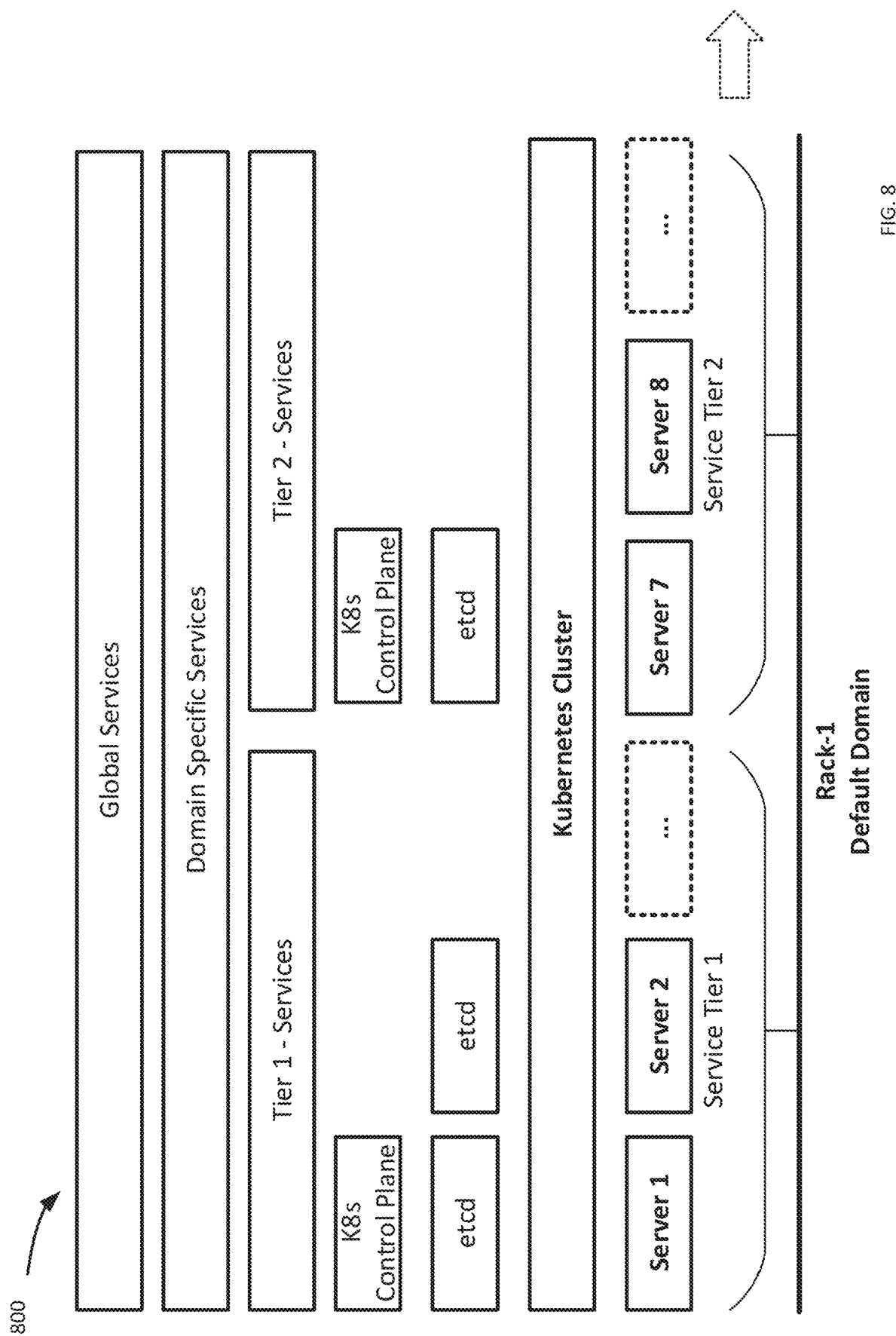
FIG. 8 illustrates a block diagram of an example storage data platform which includes a default storage domain which has at least two service tiers for a framework for managing the infrastructure for storage domains and service tiers, under an embodiment.

FIG. 8 depicts an example storage data platform 800 which includes a default storage domain which has at least two service tiers, service tier 1 and service tier 2. This cluster of four or more servers has a fault tolerance of one for any server, and the storage domain has no fault tolerance. The storage data platform 800 executes an instance of global services, an instance of domain services, two instances of tier services, an instance of Kubernetes cluster services, and includes two instances of a Kubernetes control plane and three instances of an etcd database. When an administrator adds storage tier 2, the Application Management Controller moves an instance of the etcd database from service tier 1 to the first server of service tier 2, and also moves an instance of the API server application from service tier 1 to the first server of service tier 2.

FIG. 9 depicts an example storage data platform 900 which includes a default storage domain which has at least three service tiers, service tier 1, service tier 2, and service tier 3. This cluster of three or more servers has a fault tolerance of two for any server, and the storage domain has no fault tolerance. Although not depicted, the storage data platform 800 executes an instance of global services, an instance of domain services, and three instances of tier services. The storage data platform 800 also executes an instance of Kubernetes cluster services and includes two instances of a Kubernetes control plane and three instances of an etcd database. When an administrator adds service tier 3, the Application Management Controller moves an instance of the etcd database from service tier 1 to the first server of service tier 3, but without any change for the API server application.

If a server or a service tier fails in a multi-tier configuration, then the cluster may lose the quorum needed for the etcd database and the redundant copy of the API server, but the cluster remains operational and available in a degraded state. The response to a service tier failure is similar to the response to a server failure, with the exception that all servers of a service tier are failed, and the service tier is marked as deleted instead of degraded. The Cluster API Provider will get notifications of a failed service tier via a control-loop and perform similar operations as responding to a server failure, such as ejecting all servers of the failed service tier and powering these failed servers off.

Once an administrator replaces any faulty servers with new or repaired servers, the Cluster API Provider provisions each of the replacement servers by installing an operating system and a Kubernetes runtime, and then joining them together in the Kubernetes cluster. If the failed servers are in a failed service tier, then the Cluster API Provider also joins them together as a replacement service tier in the Kubernetes cluster. The Cluster API Provider invokes the Storage Domain Management Controller API to label the replacement servers with the name of the deleted service tier. The best effort is made to restore any deleted or degraded service tiers first so that any restored service tiers are transitioned from a degraded state to a high availability state.

While waiting for an administrator to replace any faulty servers with new or repaired servers, the Storage Domain Management Controller examines the impact of the failed servers on the etcd databases and the API servers which are spread across the service tiers. If the count of the etcd database and the API server instances are lower than the desired level required (a minimum of three etcd database instances and a minimum of two API server instances for a fault tolerance of 1) for high availability, then the Storage Domain Management Controller creates additional etcd database instances and additional API server instances on healthy servers, which may be grouped into a replacement service tier. The Storage Domain Management Controller can spread the etcd database instances and the API server instances across any available service tiers. When the counts of the etcd database instances and the API server instance have reached the desired level, then the cluster state is transitioned from degraded state back to a high availability state.

The Application Management Controller examines the impact on high availability of tier services applications, cluster services applications, and global services applications that were running in the failed service tier or any other service tier. For the applications which were distributed uniformly across service tiers, the Kubernetes default behavior will fail to restore the quorum because a failed server may have a service tier affinity for a service tier that does not exist anymore. However, the Application Management Controller overrides the default behavior by creating an affinity for an available server in another service tier to restore the desired count needed to maintain the high availability state of the application. If no server is available for scheduling, then the application state is transitioned from high availability to degraded. When the count of an application's instances has reached the desired level for high availability, then the application's state is transitioned back to a high availability state.

FIG. 10 depicts an example storage data platform 1000 which includes a default storage domain which has at least five service tiers, service tier 1, service tier 2, service tier 3, service tier 4, and service tier 5. This cluster of five or more servers has a fault tolerance of four for any server, and the storage domain has no fault tolerance. Although not depicted, the storage data platform 1000 executes an instance of global services, an instance of domain services, and five instances of tier services. The storage data platform 1000 also executes an instance of the Kubernetes cluster services and includes three instances of a Kubernetes control plane and five instances of an etcd database.

When an administrator adds service tier 4, no change is required. When an administrator adds service tier 5, the Application Management Controller creates two new instances of the etcd database, in service tier 4 and in service tier 5, which increases the cluster fault tolerance of the service tier from 1 to 2. Although not depicted, when an administrator adds service tier 6, no change to a Kubernetes control plane is required, but when an administrator adds service tier 7, the steps which are similar to the steps which were executed when service tier 5 was added are repeated, and this pattern continues whenever the service tier count becomes an odd number, such as 7, 9, 11, and so on, which increases the service tier's fault tolerance from 2 to 3 to 4 to 5, and so on.

Figure 11:
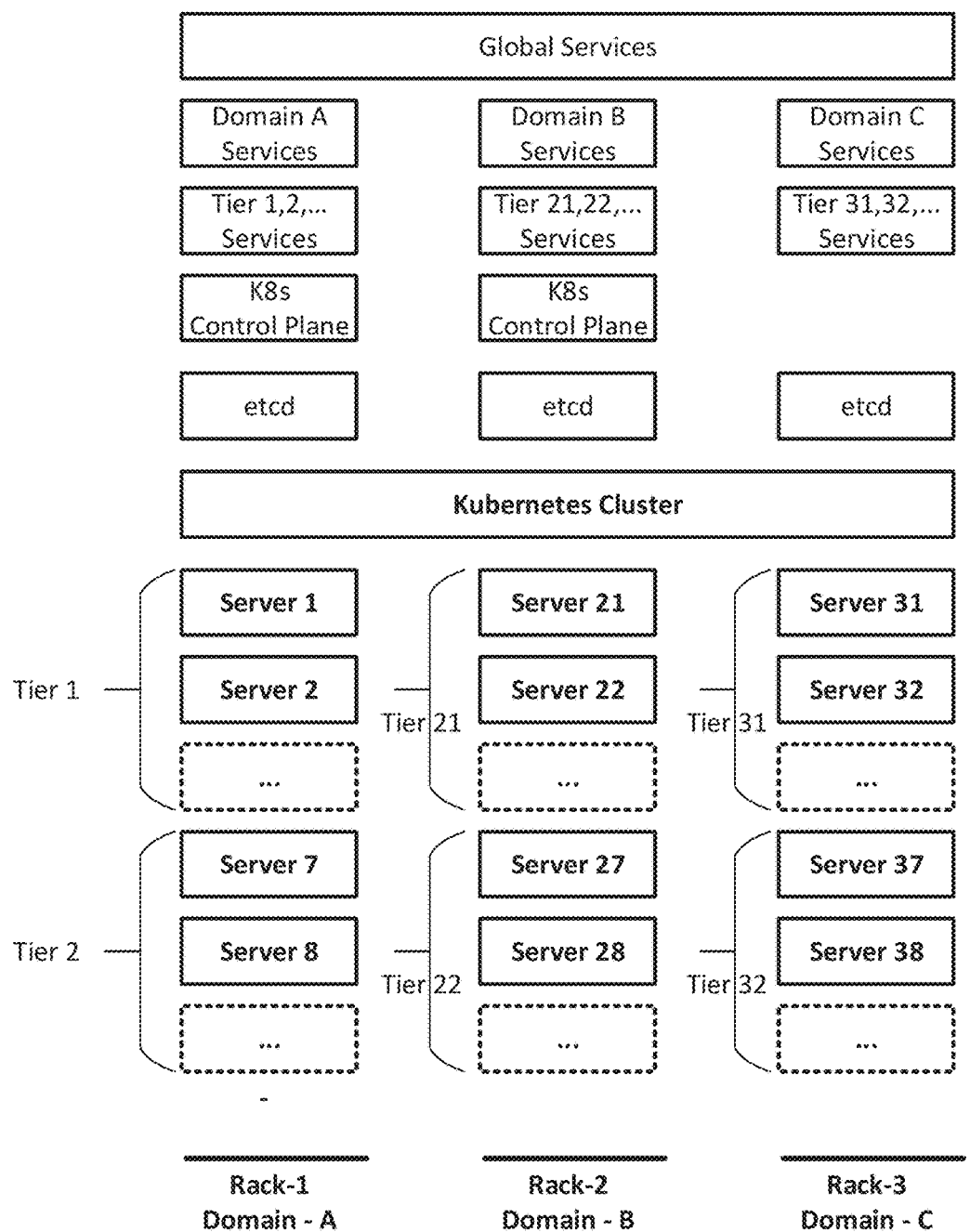
FIG. 11 illustrates a block diagram of an example storage data platform which includes three storage domains, with each storage domain having at least two service tiers, for a framework for managing the infrastructure for storage domains and service tiers, under an embodiment.

FIG. 11 depicts an example storage data platform 1100 which includes three storage domains A, B, and C, and each storage domain has at least two service tiers 1, 2, 21, 22, 31, and 32, respectively. The three storage domains A, B, and C have a fault tolerance of one storage domain. The storage data platform 1100 executes an instance of global services, three instances of domain services, three instances of tier services, an instance of Kubernetes cluster services, and includes two instances of a Kubernetes control plane and three instances of an etcd database.

When an administrator adds storage domain B and storage domain C, the Storage Domain Management Controller moves an instance of the etcd database from storage domain A to the first server of service tier 1 of storage domain B, and another instance of the etcd database to service tier 1 of storage domain C, as depicted by FIG. 11. The Storage Domain Management Controller also moves an instance of the API server from the storage domain A to service tier 1 of storage domain B, and optionally creates a new instance of the API server in service tier 1 of storage domain C to spread out the load across storage domains, as depicted by FIG. 11. The addition of storage domains B and C increases the fault tolerances of the storage domains from 0 to 1. That means if any storage domain fails, the cluster would remain highly available.

If a server, a service tier, or a storage domain fails in a multi-tier multi-domain configuration, then the cluster may lose the quorum needed for the etcd database and the redundant copy of the API server, but the cluster remains operational and available in a degraded state. The response to a storage domain failure is similar to the response to a service tier failure or a server failure, with the exception that all servers of a storage domain are failed due to a rack level failure, and the storage domain is marked as deleted instead of degraded. Since each storage domain is running at least one instance of Kubernetes control plane components, the failure of a complete storage domain requires rebalancing to restore the high availability state of the cluster. The Cluster API Provider will get notifications of a failed storage domain via a control-loop and perform similar operations as responding to a server failure or a service tier failure, such as ejecting all servers of the failed storage domain and powering these servers off.

Once an administrator replaces any faulty servers with new or repaired servers, the Cluster API Provider provisions each of the replacement servers by installing an operating system and a Kubernetes runtime, and then joining them together in the Kubernetes cluster. If the failed servers are in a failed storage domain, then the Cluster API Provider also joins them together as a replacement storage domain in the Kubernetes cluster. The Cluster API Provider invokes the Storage Domain Management Controller API to label the replacement servers with the names of the deleted service tiers and the names of the deleted storage domain.

If the failed servers are in a failed storage domain, an administrator replaces the faulty servers in the failed service tiers in the faulty storage domain with new or repaired servers, the Cluster API Provider provisions each of the replacement servers by installing an operating system and a Kubernetes runtime, and then joining them together as replacement service tiers in a replacement storage domain in the Kubernetes cluster. The Cluster API Provider invokes the Storage Domain Management Controller API to label the replacement servers with the service tier name of the degraded service tiers and the degraded storage domain name. The best effort is made to restore any deleted or degraded storage domains first so that any restored storage domains are transitioned from a degraded state to a high availability state.

While waiting for an administrator to replace any faulty servers with new or repaired servers, the Storage Domain Management Controller examines the impact of the failed servers on the etcd databases instances and the API server instances which are spread across the service tiers in the storage domains. If the count of the etcd database instances and the API server instances are lower than the desired level required (a minimum of three etcd database instances and a minimum of two API server instances for a fault tolerance of 1) for high availability, then the Storage Domain Management Controller creates additional etcd database instances and API server instances on healthy servers which can be grouped into replacement service tiers in a replacement storage domain. The Storage Domain Management Controller can spread the etcd database instances and API server instances across the available service tiers and the available storage domains. If there are not enough servers available for creating an additional storage domain as a replacement storage domain, and if the storage domain count is reduced to an even count, then the Storage Domain Management Controller can remove extra instances of the etcd database and the API server to maintain an odd number of the etcd database instances and at least one redundant copy of the API server.

If the number of still active storage domains is an odd number, then the odd number of etcd database instances are still maintained and no change is required. The storage domains which are not running an etcd database instance are marked as degraded. This process of periodically examining the current impact of the failed storage domain on the databases and the API server instances and responding accordingly is repeated until a fault tolerance of one is achieved. When the counts of the etcd database instances and the API server instance have reached the desired level, then the cluster state is transitioned from degraded state back to a high availability state.

The Application Management Controller examines the impact on high availability of tier services, domain services, cluster services, and global services applications that were running in the failed service tiers in the failed storage domain. For applications which were distributed uniformly across service tiers in storage domains, the Kubernetes default behavior will fail to restore the quorum because failed servers will have a service tier affinity for a service tier that does not exist anymore and a storage domain affinity for a storage domain that does not exist anymore.

The tier services application has a server affinity defined at a per service tier level, the Kubernetes default behavior is to create a new instance of the tier services application on the next available server within the same service tier because each server in the service tier shares the same service tier label. If no server is available for scheduling, then the tier services application's state is transitioned from high availability to degraded. The domain services application has a server affinity defined at the storage domain level, so Kubernetes will try to create a new instance on the next available server within the same storage domain.

If no server is available for scheduling, then the domain services application state is transitioned from high availability to degraded. The cluster services application has a server affinity defined at the storage domain level, so Kubernetes will try to create a new instance on the next available server within the same storage domain. If no server is available for scheduling, then the cluster services application state is transitioned from high availability to degraded. The global services application has no affinity rule, so Kubernetes will try to create a new instance in the next available server anywhere in the cluster.

However, the Application Management Controller overrides the default behavior by finding an available server in other service tiers in another storage domain to restore the desired count needed to maintain the high availability state of the application. If a tier services application was scheduled in another service tier because of the unavailability of a server in the desired service tier, the Application Management Controller now moves the tier services application by changing the affinity rule to the desired service tier to restore the original distribution. If the tier services application was in degraded state due to unavailability of servers, then Application Management Controller now creates a new instance to restore the desired count for high availability and transitions the tier services application to a high availability state. If a domain services application was scheduled in another storage domain because of the unavailability of a server in the desired storage domain, the Application Management Controller now moves the domain services application by changing the affinity rule to the desired storage domain to restore the original distribution. If the domain services application was in degraded state due to the unavailability of servers, then Application Management Controller now creates a new instance to restore the desired count for high availability and transitions the domain services application to a high availability state.

If a cluster services application was scheduled in another storage domain because of the unavailability of servers in the desired storage domain, the Application Management Controller now moves the cluster services application by changing the affinity rule to the desired storage domain to restore the original distribution. If the cluster services application was in degraded state due to the unavailability of servers, then Application Management Controller now creates a new instance to restore the desired count for high availability and transitions the cluster services application to a high availability state. For a global application, the Kubernetes default behavior would work. If no server is available for scheduling, then the application state is transitioned from high availability to degraded.

If an insufficient number of servers are available to achieve the original fault tolerance level, then the Application Management Controller removes extra instances of the quorum-based applications to maintain uniform distribution and a fault tolerance level below the original level. For example, losing service tier 1 and 2 in storage domain A results in returning to the previous fault tolerance of 1. This process is repeated until the fault tolerance is one for each quorum-based application, and then each quorum-based application's state is transitioned from high availability to degraded. When the count of application instances has reached the desired level for high availability, then the application state is transitioned back to a high availability state.

Figure 12:
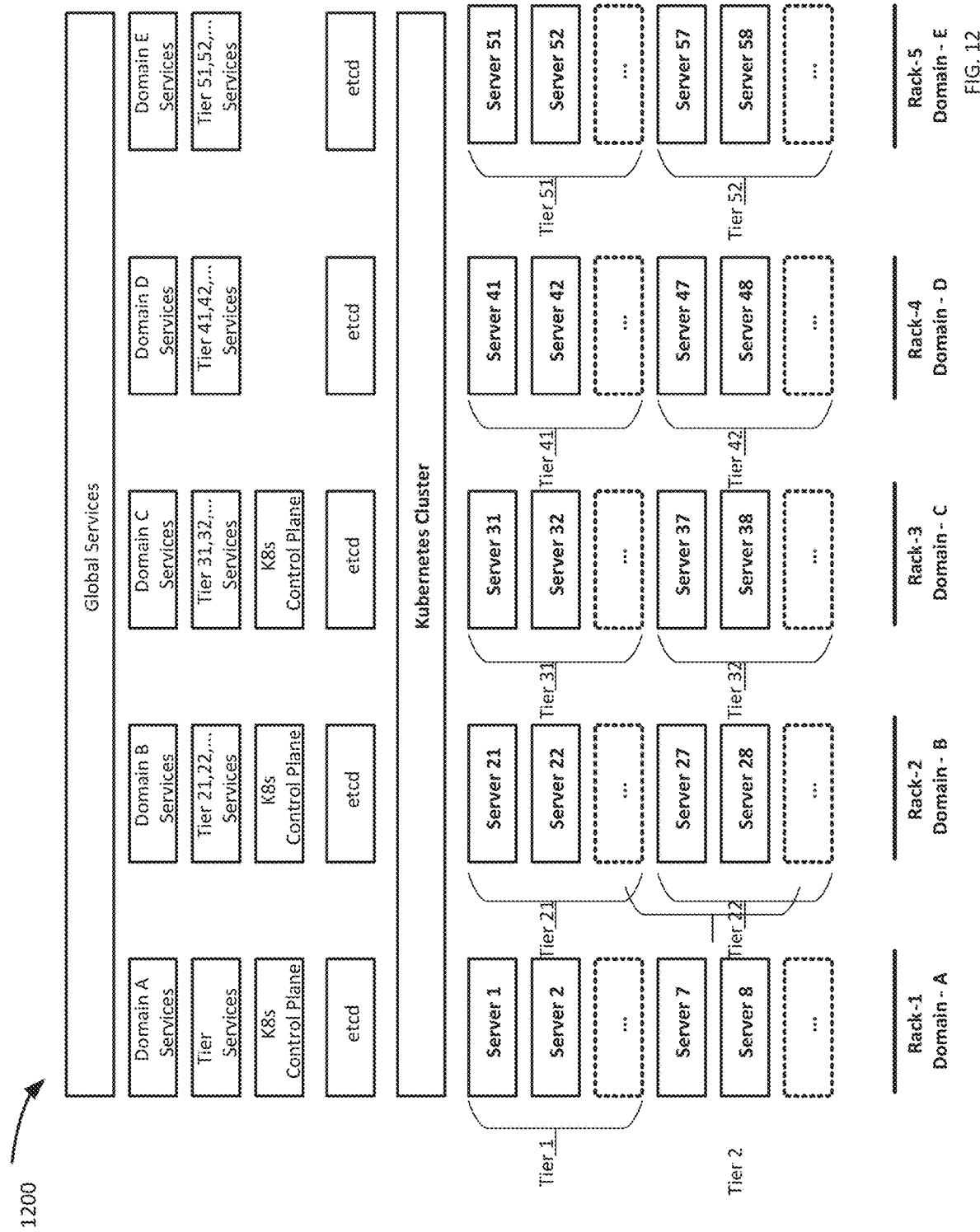
FIG. 12 illustrates a block diagram of an example storage data platform which includes five storage domains, with each storage domain having at least two service tiers, for a framework for managing the infrastructure for storage domains and service tiers, under an embodiment.

If there was a single storage domain, such as in FIG. 7, which was then split into multiple service tiers, such as in FIG. 8, then the Kubernetes control plane components are rebalanced across the service tiers within the storage domain. However, when a cluster has three or more storage domains, such as in FIG. 11, then adding a service tier within one of these storage domains has no impact on the distributed configuration because each storage domain has only one instance of the etcd database and only one instance of the API server. FIG. 12 depicts a storage data platform 1200 which includes five storage domains A, B, C, D, and E, and each storage domain has at least two service tiers 1, 2, 21, 22, 31, 32, 41, 42, 51, and 52, respectively. The five storage domains A, B, C, D, and E each has a fault tolerance of two storage domains. The storage data platform 1200 executes an instance of global services, five instances of domain services, at least ten instances of tier services, an instance of Kubernetes cluster services, and includes three instances of a Kubernetes control plane and five instances of an etcd database.

When an administrator adds storage domain D and storage domain E to the cluster, the Storage Domain Management Controller creates a new instance of the etcd database on each of the first server of service tier 1 of storage domain D and the first server of service tier 1 of storage domain E, as depicted by FIG. 12. The Storage Domain Management Controller optionally creates a new instance of API server on each of service tier 1 of storage domain D and service tier 1 of storage domain E, spreading out the load across the storage domains, as depicted by FIG. 12. The addition of storage domain D and storage domain E increases the storage domain fault tolerance from 1 to 2, which means that the cluster can tolerate the failure of at most two storage domains. However, losing any storage domain to failure results in a fault tolerance of one for any quorum-based application in the storage domain. Since a new storage domain is installed with a default service tier, the Application Management Controller follows the distribution logic as specified in the initial setup by duplicating an instance of the tier services application in the default service tier of the new storage domain.

Figure 13:
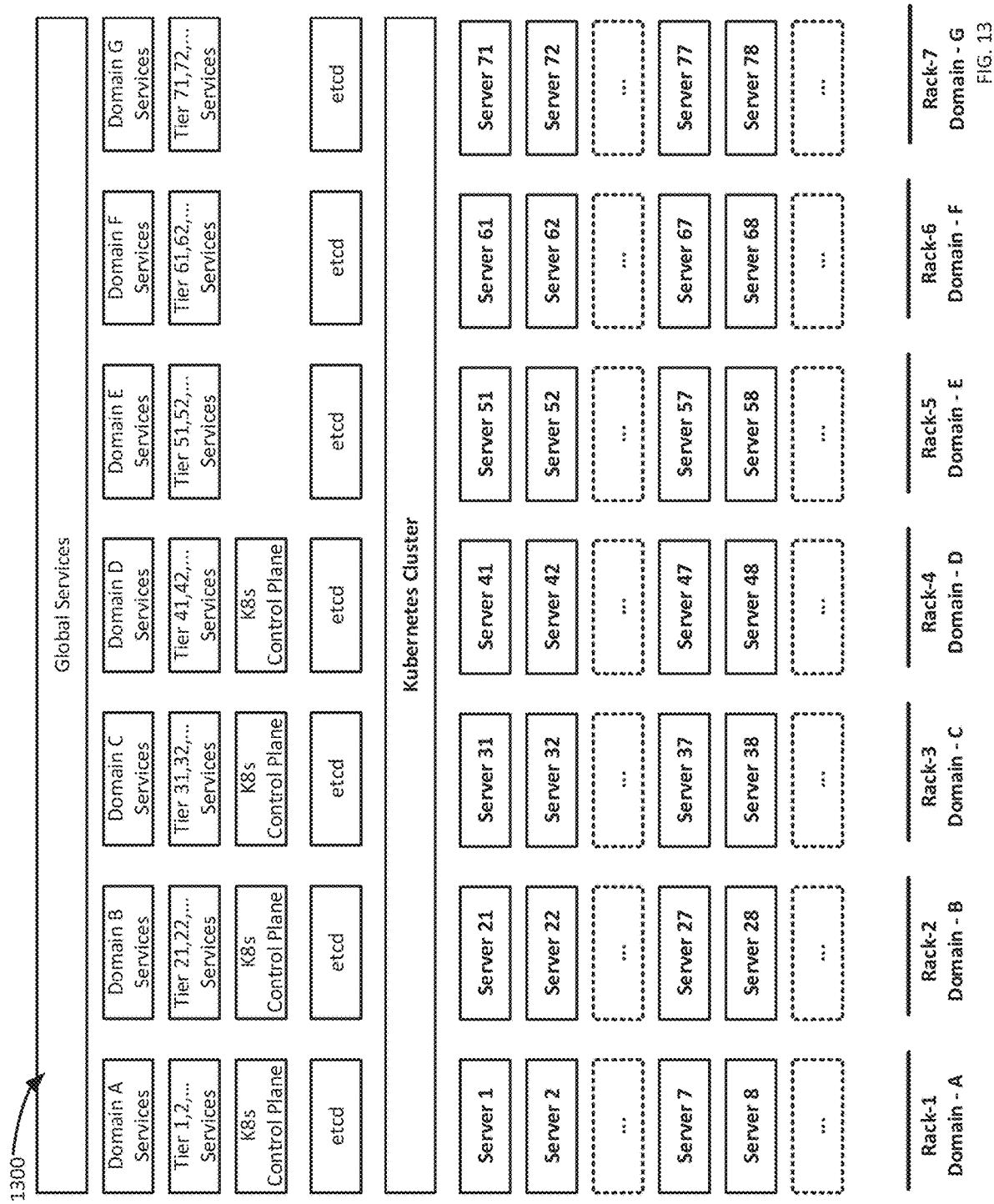
FIG. 13 illustrates a block diagram of an example storage data platform which includes seven storage domains, with each storage domain having at least two service tiers, for a framework for managing the infrastructure for storage domains and service tiers, under an embodiment.

FIG. 13 depicts a storage data platform 1300 which includes seven storage domains A, B, C, D, E, F, and G, and each storage domain has at least two service tiers which include servers 1, 2, 7, 8, 21, 22, 27, 28, 31, 32, 37, 38, 41, 42, 47, 48, 51, 52, 57, 58, 61, 62, 67, 68, 71, 72, 77, and 78, respectively. The storage domains A, B, C, D, E, F, and G have a fault tolerance of three storage domains. The storage data platform 1300 executes an instance of global services, seven instances of domain services, at least 14 instances of tier services, an instance of Kubernetes cluster services, and includes four instances of a Kubernetes control plane and seven instances of an etcd database.

When an administrator adds storage domain F and storage domain G to the cluster, the Storage Domain Management Controller creates a new instance of the etcd database on each of the first server of service tier 1 of storage domain F and the first server of service tier 1 of storage domain G, as depicted by FIG. 15. The Storage Domain Management Controller optionally creates a new instance of API server on each of service tier 1 of storage domain F and service tier 1 of storage domain G, spreading out the load across the storage domains, as depicted by FIG. 13. The addition of storage domain F and storage domain G increases the storage domain fault tolerance from 2 to 3 which means the cluster can tolerate the failure of at most three storage domains.

This pattern continues when the storage domain count reaches to 9, and 11, and so on, thereby increasing the storage domain fault tolerance from 3 to 4, and so on. The creation of additional instances of the API server becomes a requirement for a cluster with three or more storage domains, which increases the storage domain fault tolerance from 1 to 2 to 3. . . . The formula for the number of required API servers is Count(API Server)=storage domain fault tolerance+2, where the storage domain fault tolerance=(0, 1, 2, 3, . . . ). If there are enough servers, all of the instances of the API server and the etcd database are installed on separate servers instead of the same server.

A Kubernetes system allows extensions via custom resource definitions. The system uses the following custom resource definitions to expose Kubernetes Application Programming Interfaces (API) for Create, Retrieve, Update, and Delete (CRUD) operations on server pools, service tiers, and storage domains. The system starts with the discovery of all servers across server racks interconnected with Top Of Rack switches forming a spine-leaf network topology. FIG. 14 depicts a Custom Resource Definition 1400 for a server, which defines characteristics of a server, such as a server's rack, model, cores, memory, storage media, storage capacity, network, vendor, speed, and accelerators.

Each server is further examined when a system fetches the inventory of all hardware components. The hardware inventory can help a system identify server capabilities based on the type of storage media, such as hard disk drives and solid-state drives, a Network Interface Controller (NIC), and accelerators, such as Intel Quick Assist Technology (QAT). A system can profile servers by performance characteristics to help select the servers for defining service tiers. FIG. 15 depicts a Custom Resource Definition 1500 for server pools, which defines characteristics of a server pool, such as a server pool's name, servers, status, and state. A service tier is a logical representation of servers with similar hardware profiles which define service level agreement performance. FIG. 16 depicts a Custom Resource Definition 1600 for storage domains with service tiers, which defines characteristics of a storage domains with service tiers, such as a storage domain's name, rack number, service tiers' names, server pool, service level agreement performance, backup rate, and restore rate.

FIG. 17 depicts a Custom Object 1700 that represents an instantiation of a server, such as a server's name, rack, model, cores, memory, storage media, storage capacity, network, vendor, speed, and accelerators. The code snippets show the instantiation of the Custom Resource Definitions depicted in previous figures. These custom objects are created, updated, queried, and/or deleted through a Kubernetes API or the kubectl command line tool, and then persisted into a Kubernetes database. FIG. 18 depicts a Custom Object 1800 that represents an instantiation of a server pool, such as a server pool's name and servers. FIG. 19 depicts a Custom Object 1900 that represents an instantiation of a storage domain, such as a storage domain's name, rack, and each service tier's name, server pool, service level agreement performance, backup rate, and restore rate.

FIG. 20A depicts the first half of the code listings 2000 for the framework's main algorithm and FIG. 20B depicts the second half of the code listings 2000 for the framework's main algorithm. The depicted code snippets 2000 illustrate how labels are applied to nodes using a Kubernetes command line interface. The Storage Domain Management Controller performs this operation automatically over a group of Kubernetes nodes identified by a storage domain custom object.

The Pod Affinity Rule Controller is an intelligent controller which intercepts the application deployment workflow to add the Kubernetes "nodeSelector" attribute to the Kubernetes pod specification with a key-value pair matching with node labels. The nodeSelector and replicas attributes in a pod specification helps the Kubernetes scheduler to schedule such a pod on a Kubernetes node which has labels which match the pod's labels. FIG. 21 depicts a Custom Object 2100 that represents an instantiation of a pod, such as a pod's name, high availability strategy (quorum or redundancy), and affinity for a cluster, service tier, storage domain, and global.

The Pod Affinity Rule Controller applies the nodeSelector attribute based on custom annotations "dpa.example.com/affinity" and "dpa.example.com/haStrategy." The annotations are decided by application developers at the time of defining the application. The affinity annotation "dpa.example.com/affinity" helps the Pod Affinity Rule Controller decide which type of nodeSelector attribute to apply in the pod specification. The cluster level affinity helps determine the minimum number of pod instances across a cluster to maintain the high availability state of the application or service.

The service tier affinity helps duplicating instances of a pod at each service tier as more service tiers are created and helps removing instances of a pod when a service tier is deleted. The storage domain affinity helps duplicating instances of a pod at each storage domain as more storage domains are created and helps removing instances of a pod when a storage domain is deleted. The global affinity means do not apply the nodeSelector attribute and let the Kubernetes system schedule a pod anywhere in the cluster, which is the default behavior of Kubernetes.

The high availability strategy annotation "dpa.example.com/haStrategy" helps an Application Management Controller to create and/or recreate the minimum number of pod instances to maintain a high availability state. The quorum-based high availability strategy requires maintaining a pattern of 3, 5, 7, . . . instances, whereas the redundancy-based high availability strategy requires maintaining a pattern of 2, 3, 4, 5, . . . instances. FIG. 22 depicts a Custom Object 2200 that represents an instantiation of a pod affinity. The Application Management Controller is responsible for deployment of applications and intelligently maintaining the minimum number of instances of pods hosting an application across a cluster to tolerate the required minimum number of failed nodes. The Application Management Controller works with the Pod Affinity Rule Controller to identify application types and to update the manifest to reflect replicas and node affinity rules.

While using the Cluster API interface, an administrator has an option to add more storage domains in increments of two to maintain an odd number of storage domains. Within each storage domain, an administrator has the option to add more servers to expand the storage domain and use additional severs to create any number of new service tiers. An administrator may also have an option to split one storage domain into two or more storage domains.

A master node responds to detecting a server failure by identifying which applications executed on the failed server, identifying which servers are specified for replacing the failed server, allocating a replacement server from the specified servers, and installing the identified applications in the replacement server. A master node responds to detecting a service tier failure by identifying which applications executed on which servers hosted by the failed service tier, and identifying which servers are specified for service tiers for replacing the failed service tier. Then the master node allocates the specified servers for a replacement service tier and installs the identified applications in the replacement servers in the replacement service tier. A master node responds to detecting a storage domain failure by identifying which applications executed on which servers hosted by which service tiers in the failed storage domain, and identifying which servers are specified for replacing the failed servers in the failed service tiers in the failed storage domain. Then the master node allocates the replacement servers in the replacement service tiers in the replacement storage domain and installs the identified applications in the replacement servers in the replacement service tiers in the replacement storage domains.

Figure 23:
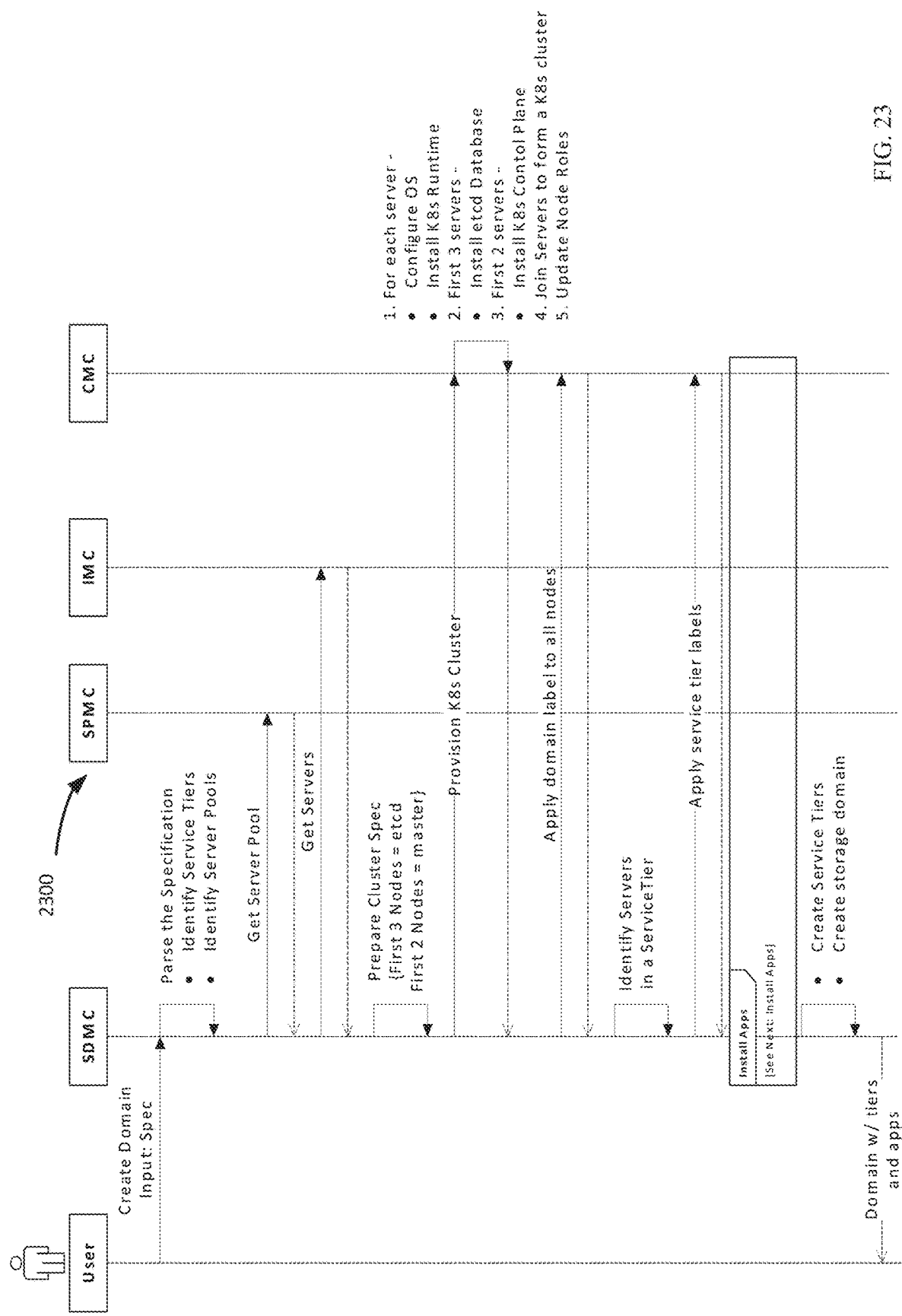
FIG. 23 illustrates an example sequence diagram for creating storage domains for a framework for managing the infrastructure for storage domains and service tiers, under an embodiment.

FIG. 23 depicts a sequence diagram 2300 for the use case of creating one or more storage domains, with each storage domain including one (default) or more service tiers. The sequence diagram 2300 initiates with a Storage Domain Management Controller receiving a storage domain specification from a user. The Storage Domain Management Controller parses the specification, identifies the required number of service tiers, identifies the available server pools, identifies one of these server pools which is managed by a Server Pool Management Controller, and identifies the required number of servers, which are managed by an Inventory Management Controller, from the identified server pool. The Storage Domain Management Controller prepares a cluster specification in which the first three nodes in a cluster will store an etcd database and the first two nodes in a cluster will be master nodes.

The Storage Domain Management Controller instructs a Cluster Management Controller to provision a Kubernetes cluster. The Cluster Management Controller configures the operating system and installs Kubernetes runtime on each server. Then the Cluster Management Controller installs an etcd database on the first three servers in the cluster and installs a Kubernetes control plane on the first two servers in the cluster. Next, the Cluster Management Controller joins the servers to form a Kubernetes cluster and updates the node roles.

The Storage Domain Management Controller applies storage domain labels to all nodes in the cluster, identifies the servers for each service tier, and applies service tier labels to the servers for each service tier. Then the Storage Domain Management Controller installs the appropriate applications in the cluster's servers. The Storage Domain Management Controller uses the service tier labels and the storage domain labels to create service tiers and storage domains, and then deploys the storage domains with service tiers and applications for the user.

Figure 24:
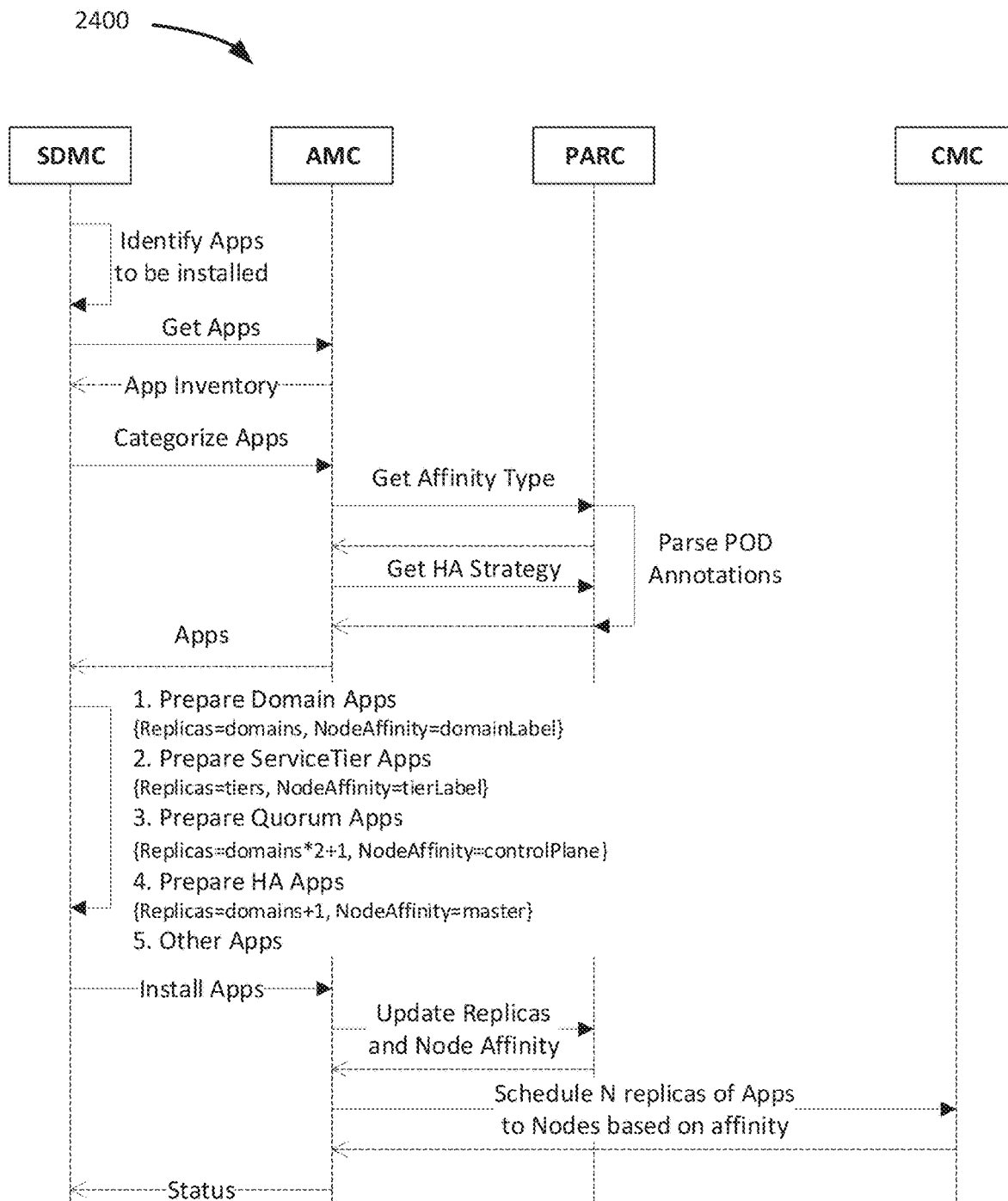
FIG. 24 illustrates an example sequence diagram for installing and/or re-installing applications for a framework for managing the infrastructure for storage domains and service tiers, under an embodiment.

FIG. 24 depicts a sequence diagram 2400 for the use case of installing and/or re-installing applications. The Storage Domain Management Controller identifies applications to be installed, requests the applications from an Application Management Controller which provides an application inventory, and categorizes the requested applications listed in the application inventory. The Application Management Controller requests the affinity types for the requested applications and the high availability strategy from a Pod Affinity Rule Controller, which parses pod annotations to identify the affinity types and the high availability strategy for each requested application and provides the identified affinity types and the high availability strategy for each requested application to the Application Management Controller. The Application Management Controller provides the requested applications to the Storage Domain Management Controller. Then the Storage Domain Management Controller uses each node's storage domain label to identify a node for each storage domain and prepares a storage domain application for each identified storage domain.

The Storage Domain Management Controller identifies each node that has a service tier label and prepares a service tier application in a node in each identified service tier. The Storage Domain Management Controller prepares a number of quorum applications based on the number of storage domains and the affinity of quorum applications to control plane nodes. The Storage Domain Management Controller prepares a number of high availability applications based on the number of storage domains and the affinity of high availability applications to each master node, and prepares any other applications for any other nodes.

The Storage Domain Management Controller instructs the Application Management Controller to install the prepared applications in the appropriate nodes based on the node affinity of each requested application. The Application Management Controller updates the numbers of replicas for each application and the node affinity for each application for the Pod Affinity Rule Controller. The Application Management Controller and the Cluster Management Controller schedule the identified number of replicas of each application to be installed on the appropriate nodes based on the affinity of each application for the appropriate nodes, then the Application Management Controller reports the application installation status to the Storage Domain Management Controller.

Figure 25:
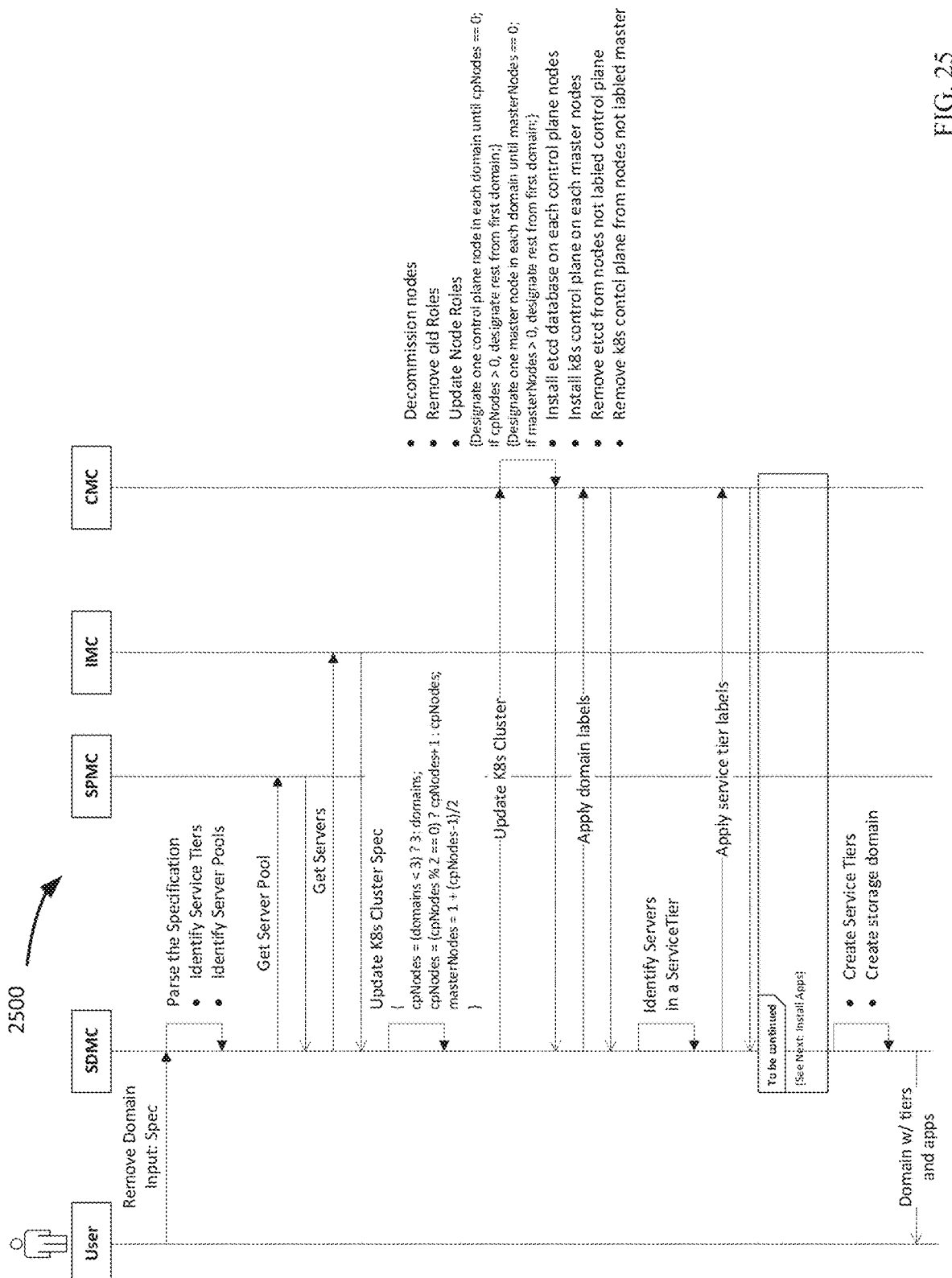
FIG. 25 illustrates an example sequence diagram for removing storage domains for a framework for managing the infrastructure for storage domains and service tiers, under an embodiment.

FIG. 25 depicts a sequence diagram 2500 for the use case of removing one or more storage domains, which may contain one (default) or more service tiers. The failure of a storage domain requires the rebalancing of stateful cluster level services to relocate the services to servers on other storage domains. With slight revisions to the removing of nodes and the reinstalling of applications, a revised sequence diagram 2500 may be used for the use case of removing a service tier from an existing storage domain. With a slight change to automatically detecting node unavailability, the rebalancing for the use case for removing a service tier follows the same logic as the rebalancing for removing a storage domain, and then requires updating the Kubernetes cluster specification, which will result in removing failed nodes and re-installing applications.

The sequence diagram 2500 initiates with a Storage Domain Management Controller receiving a storage domain specification, which may be from a user or the framework. The Storage Domain Management Controller parses the specification and identifies the required number of service tiers, identifies the available server pools, identifies one of these server pools which is managed by a Server Pool Management Controller, and identifies the required number of servers, which are managed by an Inventory Management Controller, from the identified server pool. The Storage Domain Management Controller updates the Kubernetes cluster specification based on labeling a number of control plane nodes, which is based on the number of storage domains, and labeling a number of master nodes, which is indirectly based on the number of storage domains. The Storage Domain Management Controller instructs the Cluster Management Controller to update the Kubernetes cluster of nodes and applies the appropriate storage domain labels to each of the cluster nodes.

The Cluster Management Controller decommissions nodes, removes old node roles, and updates node roles. The Cluster Management Controller labels a node in each storage domain as a control plane node until the number of required control plane nodes equals zero. If the number of required control plane nodes is still greater than zero after labeling a control plane node in each storage domain, then the Cluster Management Controller labels the remaining number of required control plane nodes in the first available storage domain. The Cluster Management Controller labels a node in each storage domain as a master node until the number of required master nodes equals zero. If the number of required master nodes is still greater than zero after labeling master nodes for each storage domain, then the Cluster Management Controller labels the remaining number of required master nodes from the first available storage domain.

The Cluster Management Controller installs an etcd database on each node labeled as a control plane node and removes any etcd databases from nodes which are not labeled as control plane nodes and installs a Kubernetes control plane on each node labeled as a master node and removes any Kubernetes control plane from nodes which are not labeled as master nodes. The Storage Domain Management Controller identifies a number of servers required for each service tier and labels the identified servers as service tier nodes. Then the Storage Domain Management Controller installs the appropriate applications in each server. The Storage Domain Management Controller uses the service tier labels and the storage domain labels to create service tiers and storage domains and deploys the storage domains with service tiers and applications to the user.

Figure 26:
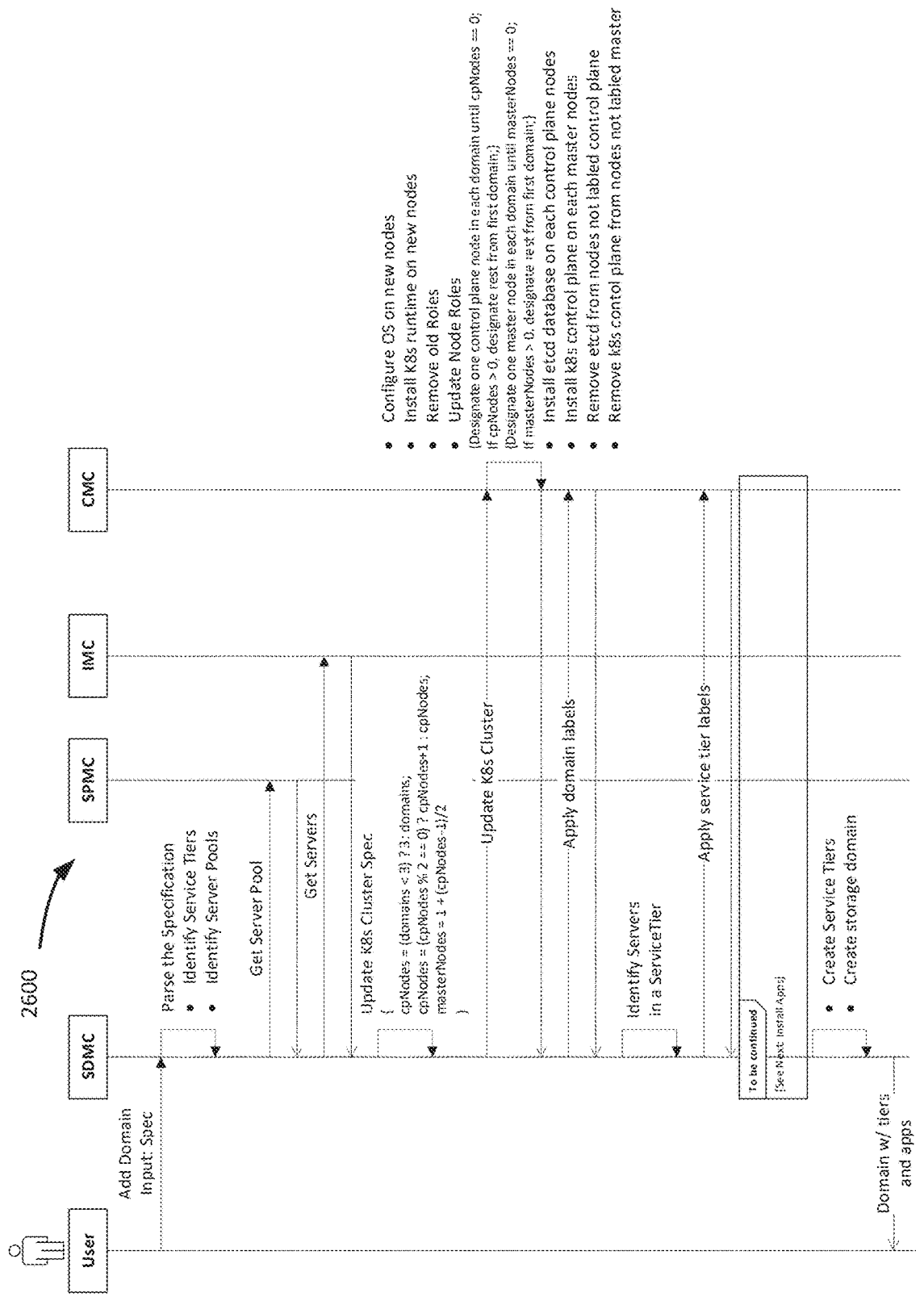
FIG. 26 illustrates an example sequence diagram for adding storage domains for a framework for managing the infrastructure for storage domains and service tiers, under an embodiment.

FIG. 26 depicts a sequence diagram 2600 for the use case of adding one or more new storage domains, which may contain one (default) or more service tiers. In order to maintain a high availability state, the framework can add two storage domains at a time and maintain an odd number of storage domains. With a slight change to the adding of new nodes and the reinstalling of applications, the use case for adding a service tier follows the same logic as adding a storage domain. With a slight change to the adding of new nodes and the reinstalling of applications, once a failed service tier is repaired, the use case for adding a service tier follows the same logic as adding a storage domain.

The sequence diagram 2600 initiates with a Storage Domain Management Controller receiving a storage domain specification from a user or the framework. The Storage Domain Management Controller parses the specification, identifies the required number of service tiers, identifies the available server pools, identifies one of these server pools which is managed by a Server Pool Management Controller, and identifies the required number of servers, which are managed by an Inventory Management Controller, from the identified server pool. The Storage Domain Management Controller updates the Kubernetes cluster specification based on labeling a number of control plane nodes, which is based on the number of storage domains, and labeling a number of master nodes, which is indirectly based on the number of storage domains. The Storage Domain Management Controller instructs the Cluster Management Controller to update the Kubernetes cluster of nodes and applies the appropriate storage domain labels to each of the cluster nodes.

The Cluster Management Controller configures the operating system, installs Kubernetes runtime for each server, remove old node roles, and updates node roles. The Cluster Management Controller labels a node in each storage domain as a control plane node until the number of required control plane nodes equals zero. If the number of required control plane nodes is still greater than zero after labeling control plane nodes for each storage domain, then the Cluster Management Controller labels the remaining number of required control plane nodes in the first available storage domain. The Cluster Management Controller labels a node in each storage domain as a master node until the number of required master nodes equals zero. If the number of required master nodes is still greater than zero after labeling master nodes for each storage domain, then the Cluster Management Controller labels the remaining number of required master nodes from the first available storage domain.

The Cluster Management Controller installs an etcd database on each node labeled as a control plane node and removes any etcd databases from nodes which are not labeled as control plane nodes and installs a Kubernetes control plane on each node labeled as a master node and removes any Kubernetes control plane from nodes which are not labeled as master nodes. The Storage Domain Management Controller identifies a number of servers required for each service tier and labels the identified servers as service tier nodes. Then the Storage Domain Management Controller installs the appropriate applications in each server. The Storage Domain Management Controller uses the service tier labels and the storage domain labels to create service tiers and storage domains and deploys the storage domains with service tiers and applications to the user.

As an example of the use case for adding a service tier, when an administrator adds service tier D to the cluster, no change to the control plane is required, but then when the administrator adds service tier E to the cluster, the Storage Domain Management Controller creates two new instances of the etcd database, with an instance in service tier D and another instance in service tier E, as depicted by FIG. 12. If there are more servers available, Storage Domain Management Controller may create one more redundant instance of the API server in service tier D to uniformly load balance the traffic across the cluster, which increases the cluster fault tolerance from 1 to 2. When an administrator adds service tier F, no change to a Kubernetes control plane is required, but when the administrator adds service tier G, as depicted by FIG. 13, the steps for adding the service tier E are repeated. This pattern continues whenever the service tier count reaches an odd number, such as 7, 9, or 11, and so on, to increase the quorum-based cluster fault tolerance from 2 to 3 to 4 to 5, and so on If there are enough servers, the API server and the etcd database remain stored on separate servers instead of stored on the same server.

Since the Kubernetes-based container orchestration already provides facilities for node labels and node affinity to spread out applications, the framework makes use of those facilities in an intelligent way. The framework identifies available stateful services and reallocates these services across storage domains to support the specified fault tolerance without impacting availability of the data platform. The framework also identifies available stateful services and reallocates these services within a storage domain across multiple service tiers without impacting the availability of the data platform. The framework can relocate stateful services back to the default storage domain in the event of a storage domain failure and relocate stateful services to expanded storage domains after recovery. The framework uses intelligent logic to validate the appropriate topology of a blast radius, provide a storage domain aware upgrade, maintenance, and serviceability procedures, and contain the spread of a ransomware or similar attack by fencing in the affected storage domain.

An integrated storage or data protection appliance may have various types of applications, such as global applications, storage domain applications, and service tier applications. Each application can further be grouped into stateless and stateful sets. A stateless application may be easily replaced with a new instance in the event of a failure of the application and a user will not notice a difference because each instance of a stateless application is the same in characteristics. A stateless application can also be scaled-out and scaled-back to handle varying loads. In contrast, a stateful application requires special consideration to maintain its state. If a server is executing a stateful application and then fails, the state of that application instance is lost. Creating another instance of the stateful application on another server requires synchronizing the state from the available instances.

Therefore, stateful applications may require at least two instances to support high availability with a fault tolerance of 1. This requires adding custom annotations in the pod specification to identify the application type as stateful and then requires strategic placement of these stateful applications by dynamically modifying their pod affinity rules based on the labels which were used for the logical partitioning of the cluster into storage domains and service tiers. Developers can use Kubernetes custom annotations for pod specifications to describe the application type and their high availability strategy. The high availability strategy of an application minimizes the downtime if an instance of the application goes down because other instances can serve the request while the failed instance is being restarted. These annotations are processed by Pod Affinity Rule Controller and communicated to Application Management Controller during application deployment flow and the Application Management Controller and the/Pod Affinity Rule Controller automatically change the pod specification of the application to add the correct affinity rule based on the labels for logical placement of applications in storage domains and service tiers.

In the event of a cluster state change, the Application Management Controller receives a notification from the Storage Domain Management Controller and then automatically rebalances applications as needed to maintain a high availability configuration and distribution of applications across service tiers and storage domains in a cluster. This intelligent applications placement logic is required to overrule the default behavior provided by the Kubernetes scheduler, which has no knowledge of storage domains or service tier boundaries. The custom annotation is required to provide automation and avoid hardcoded affinity rules by developers and manual rebalancing of applications. Kubernetes allows adding metadata in the form of key/value pairs of text to existing resource definitions, such as a pod specification. Developers can use annotations in their pod specification while packaging applications for Kubernetes.

Although the following paragraphs describe Dell Corporation's PowerProtect® backup/restore application, Dell Corporation's NetWorker® backup/restore application, and Dell Corporation's Avamar® backup/restore application as examples of the backup/restore application 102, the backup/restore application 102 may be any other type of backup/restore application which provides the backup/restore functionalities described in the Background section. A backup server may be any other type of backup server which provides the backup/restore functionalities described in the Background section.

The backup/restore application 102 may be a Dell Corporation's PowerProtect® Data Manager backup/restore application, which supports Microsoft SQL/Exchange/DB2/Oracle/SAP Oracle/SAP HANA/Filesystem/Hadoop and ProtectPoint solutions, as well as Kubernetes containers and virtual environments. Providing more than just access to backups and restore capabilities, PowerProtect® Data Manager provides analytics and reuse for development/testing, leverages the cloud to extend data center capabilities, and protects cloud native applications. PowerProtect® Data Manager's automated orchestration of fail-over, failback, and testing simplifies production disaster recovery scenarios. PowerProtect® Data Manager empowers data and application owners to perform self-service backup and restore operations from native applications directly to Dell protection storage appliances.

When superior performance is crucial, PowerProtect® Data Manager provides a direct path between Dell tier one storage and PowerProtect® Data Domain and/or Data Domain. PowerProtect® Data Manager extends protection to the cloud by tiering backups to cloud storage for long-term retention, thereby maximizing retention and access to backups without impacting on-premises protection storage resources. When tiering is not enough, PowerProtect® Data Manager enables disaster recovery to the public cloud. At the same time, PowerProtect® Data Manager's governance control provides IT with the necessary oversight and governance to ensure compliance, making even the strictest service level objectives obtainable.

The backup/restore application 102 may be a Dell Corporation's NetWorker® backup/restore application, which is a suite of enterprise level data protection software that unifies and automates backup to tape, disk-based, and flash-based storage media across physical and virtual environments for granular and disaster recovery. Cross-platform support is provided for many environments, including Microsoft® Windows®. A central NetWorker® server manages a data zone that contains backup clients and NetWorker® storage nodes that access the backup media. The NetWorker® management console software provides a graphic user interface for functions such as client configuration, policy settings, schedules, monitoring, reports, and daily operations for deduplicated and non-deduplicated backups.

The core NetWorker® software backs up client file systems and operating system environments. Add-on database and application modules provide backup services for products such as Microsoft® Exchange Server. Client backup data may be sent to a remote NetWorker® storage node or stored on a locally attached device using a dedicated storage node. Dell Corporation's NetWorker® modules for Microsoft® applications supports Microsoft® products such as Microsoft® Exchange, Microsoft® Sharepoint, Microsoft® SQL Server, and Microsoft® Hyper-V servers.

The backup/restore application 102 may be Dell Corporation's Avamar® backup/restore application, which provides fast, efficient backup and recovery through a complete software and hardware solution. Equipped with integrated variable-length deduplication technology, Dell Corporation's Avamar® backup/restore application facilitates fast, periodic full backups for virtual environments, remote offices, enterprise applications, network access servers, and desktops/laptops. Data deduplication significantly reduces backup time by only storing unique periodic changes, while always maintaining periodic full backups for an immediate single step restore. The transmission of deduplicated backup sends only changed blocks, reducing network traffic.

Dell Corporation's Avamar® backup/restore application leverages existing local area network and wide area network bandwidth for enterprise-wide and remote/branch office backup and recovery. Every backup is a full backup, which makes it easy for users to browse, point, and click for a single-step recovery. Dell Corporation's Avamar® data store features redundant power and networking, redundant array of independent disks, and redundant array of inexpensive nodes technology to provide uninterrupted data accessibility. Periodic checks of data systems ensure recoverability whenever needed. Dell Corporation's Avamar® systems may be deployed in an integrated solution with Dell Corporation's Data Domain® systems for high-speed backup and recovery of specific data types.

The backup/restore application 102 may use different policies for various data protection levels, such as a "gold" policy for VMware® clients, a "platinum" policy for UNIX® clients, and a "silver" policy for Windows® clients. The gold policy can specify to store two backup copies for each VMware® client's application resources onto the first disk for six months, store a primary clone of the backup copies onto the second disk for one year, and store a secondary clone of the backup copies onto a tape for five years. In another example, a policy can provide redundancy by specifying to replicate each full backup copy to three different backups servers, replicate each incremental cumulative backup copy and each incremental differential backup copy to two different backup servers, replicate each archive log backup copy to an additional backup server, and relocate each full backup copy created at the end of the month to cloud tiering for long term retention. Backup copies stored in the cloud tiering have higher costs associated with storing and accessing the data in the backup copies. A policy's start time can specify the start times for creating a backup copy of an application resource, such as 12:00, 13:00, 14:00, and 15:00, for an hourly backup copy, a policy's retention policy can specify the length of time that a backup copy is retained before the backup copy is destroyed, such as a week, a month, or a year, and a policy's destination pool can include the target storage device where backup copies are stored.

Figure 27:
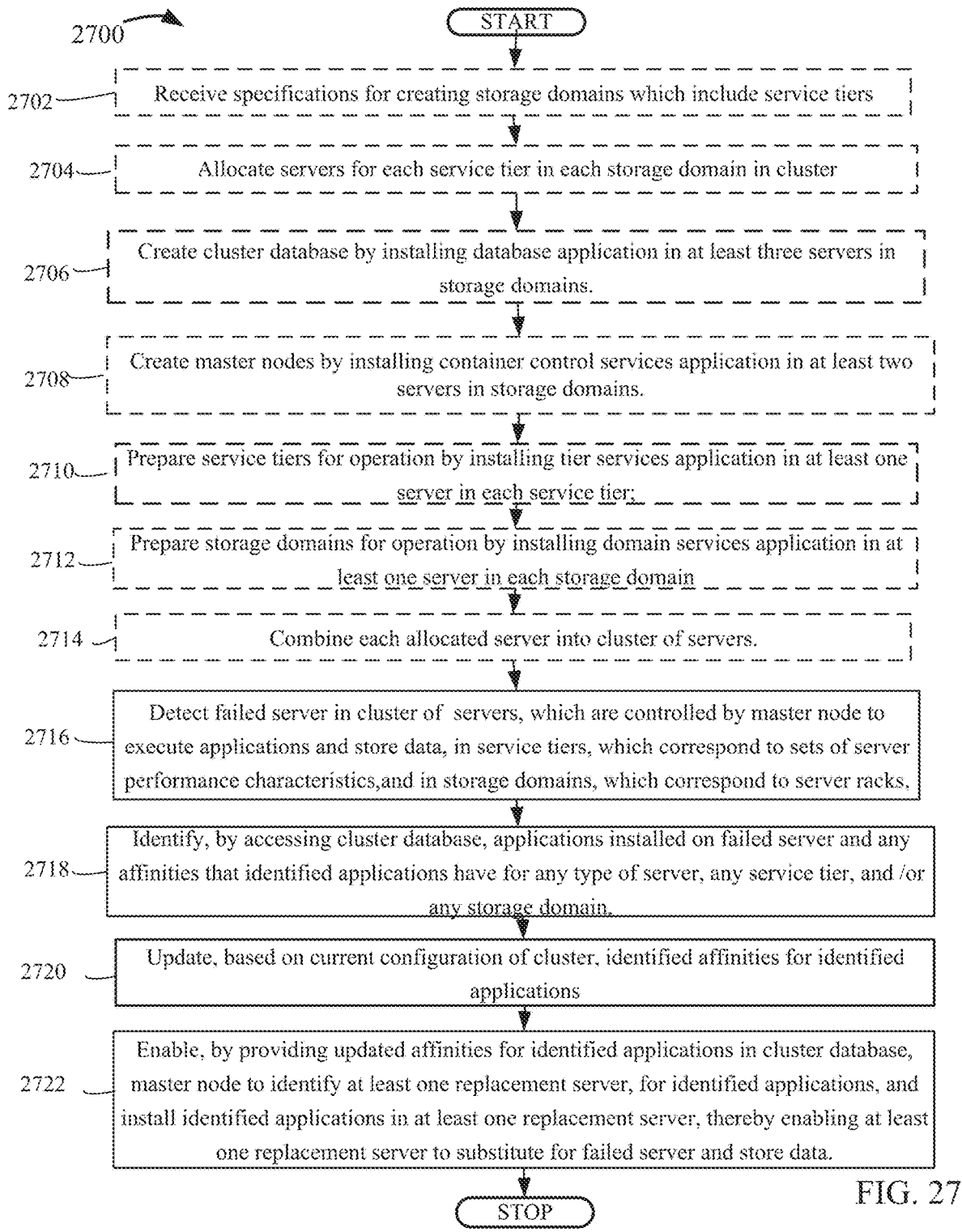
FIG. 27 is a flowchart that illustrates an example method for a framework for managing the infrastructure for storage domains and service tiers, under an embodiment.

FIG. 27 is a flowchart that illustrates a method for a framework for managing the infrastructure for storage domains and service tiers in an embodiment. Flowchart 2700 depicts method acts illustrated as flowchart blocks for certain steps involving the client device 106, the primary data storage platform 108, and/or the secondary data storage platform 110 of FIG. 1.

A system receives specifications for optionally creating storage domains which include service tiers, block 2702. A system receives storage domain and service tier specifications. For example, and without limitation, this can include a framework's Storage Domain Management Controller receiving three storage domain specifications from a user.

A specification can be a detailed description of the design and materials used to make something. A storage domain can be a network of computers and devices that are controlled by a set authority and have specific guidelines for the retention of data. A service tier can be computer components that perform different levels of automated retention tasks.

In response to receiving the specifications for creating storage domains which include service tiers, servers are optionally allocated for each service tier in each storage domain in the cluster of servers, block 2704. A system allocates the servers for the service tiers and storage domains. For example, and without limitation, this can include the Storage Domain Management Controller parsing the three specifications for creating the storage domains A, B, and C, which correspond to the server racks 1, 2, and 3, respectively, identifying the two service tiers of hard disk drives and solid-state drives for each of the three domains A, B, and C, and identifying six servers for each of the six service tiers, which results in allocating the required number of 36 servers for the three domains A, B, and C, as depicted by FIG. 11. The Storage Domain Management Controller identifies the applications to be installed in the 36 servers from the specifications, retrieves the identified applications from an Application Management Controller's application inventory, and requests a Pod Affinity Rule Controller to identify the affinity types and the high availability strategy for each retrieved application. A server can be a computer that executes computer programs which assist client devices in storing copies of data objects for retention within dedicated files. A cluster can be several computers linked on a network and implemented like an individual entity.

The system allocates servers for service tiers and storage domains. In embodiments, this can include the Storage Domain Management Controller labeling six servers with hard disk drives and six servers with solid-state drives in the server rack 1 with the labels of service tier 1 and service tier 2 for the storage domain A. The Storage Domain Management Controller also labels six servers with hard disk drives and six servers with solid-state drives in the server rack 2 with the labels of service tier 1 and service tier 2 for the storage domain B. The Storage Domain Management Controller additionally labels six servers with hard disk drives and six servers with solid-state drives in server rack 3 with the labels of service tier 1 and service tier 2 for the storage domain C.

After allocating servers for service tiers and storage domains, a cluster database is optionally created by installing a database application in at least three servers in the storage domains, block 2706. The system can create a distributed database for cluster data. By way of example and without limitation, this can include the framework's Cluster Management Controller installing an etcd database in three servers which correspond to the storage domain A, the storage domain B, and the storage domain C, as depicted in FIG. 11, because three servers are sufficient for a fault tolerance of one domain when executing the etcd database. In another example, the framework's Cluster Management Controller installs an etcd database in five servers which correspond to the storage domain A, the storage domain B, the storage domain C, the storage domain D, and the storage domain E, as depicted in FIG. 12, because five servers are sufficient for a fault tolerance of two domains when executing the etcd database. A cluster database can be a structured set of computer accessible information referencing several computers linked on a network and implemented like an individual entity. A database application can be a program that executes a particular task or set of tasks for a structured set of computer accessible information.

Following the allocation of servers to service tiers and storage domains, master nodes are optionally created by installing a container control services application in at least two servers in the storage domains, block 2708. The system creates master nodes for managing the other servers. For example, and without limitation, this can include the framework's Cluster Management Controller installing a Kubernetes control plane in a server in storage domain A and a server in storage domain B, as depicted by FIG. 11, because two servers are sufficient for a fault tolerance of one domain when executing the Kubernetes control plane.

In another example, the framework's Cluster Management Controller installs a Kubernetes control plane in a server in storage domain A, a server in storage domain B, and a server in storage domain C, as depicted by FIG. 12, because three servers are sufficient for a fault tolerance of two domains when executing the Kubernetes control plane. A master node can be a computer that executes computer programs which have control over other computers which assist client devices in storing copies of data objects for retention within dedicated files. A container control services application can be a program that automates software deployment, scaling, and management for programs that execute a particular task or set of tasks for storing copies of data objects for retention within dedicated files.

After allocating servers to service tiers and storage domains, service tiers are optionally prepared for operation by installing a tier services application in at least one server in each service tier, block 2710. The system creates servers which provide tier services. In embodiments, this can include the he Storage Domain Management Controller identifying six servers for each of the six service tiers based on the servers' characteristics, and applying the appropriate service tier labels to the 36 servers. Then the Storage Domain Management Controller identifies each server that has a service tier label and prepares the service tiers for operation by installing a tier services application in at least one server in each service tier, thereby creating the six service tiers specified by the three domain specifications. A tier services application can be a program that executes different levels of automated tasks for the retention of data.

Following the allocation of servers to service tiers and storage domains, storage domains are optionally prepared for operation by installing a domain services application in at least one server in each storage domain, block 2712. The system creates servers that provide domain services. For example, and without limitation, this can include the Storage Domain Management Controller applying three storage domain labels to the allocated servers. Later, the Storage Domain Management Controller uses each server's storage domain label to identify a server for each storage domain and install a domain services application in these identified servers, thereby creating the three storage domains A, B, and C, as specified by the three domain specifications, as depicted by FIG. 11. A domain services application can a network of programs that are controlled by a set authority and have specific guidelines for executing automated tasks to retain data.

Having allocated servers to service tiers and storage domains, each allocated server is optionally combined into a cluster of servers, block 2714. The system can create a cluster of the servers allocated to the storage domains. By way of example and without limitation, this can include the framework's Cluster Management Controller joining the 36 servers to form a Kubernetes cluster, and the Storage Domain Management Controller deploying the three storage domains A, B, and C, which include multiple service tiers and applications, for the user.

After deploying a cluster of servers, a failed server is detected in the cluster of servers, which are controlled by a master node to execute applications and store data, in service tiers, which correspond to sets of server performance characteristics, in storage domains, which correspond to server racks, in the cluster of servers, block 2716. The system identifies a loss of communication with any servers in a cluster. In embodiments, this can include the framework's Inventory Management Controller using an automatic discovery process to detect the failure of server 7 to communicate and sending this event to the Kubernetes event stream to notify other controllers, including the Application Management Controller.

A failed server can be a computer which is malfunctioning in some aspect for executing computer programs which assist client devices in storing copies of data objects for retention within dedicated files. An application can be a program that executes automated tasks. Data can be information. A server rack can be a supporting framework that holds hardware modules for a computer that executes computer programs which assist client devices in storing copies of data objects for retention within dedicated files. A server performance characteristic can be execution capabilities for a computer that executes computer programs which assist client devices in storing copies of data objects for retention within dedicated files. A set can be a collection of elements.

In response to detecting the failed server in the cluster, the applications installed on the failed server are identified and any affinities are identified that the identified applications have for any type of server, any of the service tiers, and/or any of the storage domains, block 2718. The identified applications may include a container control services application, a tier services application, a domain services application, and/or a database application. The system identifies applications which need to be relocated to a replacement server and affinities for selecting the replacement server. For example, and without limitation, this can include the Application Management Controller responding to the failure of server 7 by using an API server to query an active etcd database to identify that a Kubernetes control plane and an etcd database application were both installed on the failed server 7, and have affinities for servers with solid-state drives and storage domain A.

Identifying any affinities may include identifying a count for the identified applications based on a count of the storage domains, a count of the service tiers, and/or a high availability strategy. For example, the Application Management Controller determines that the high availability strategy of redundancy for a Kubernetes control plane requires two instances of a Kubernetes control plane to be installed on the servers in storage domain A. A count can be a total number of something. A high availability strategy can be a policy to increase accessibility.

Following the identification of the failed server and its applications and affinities, the identified affinities for the identified applications are updated based on the current configuration of the cluster, block 2720. The system identifies where the identified applications may be installed in servers in the service tiers in the storage domains. By way of example and without limitation, this can include the Application Management Controller determining from affinity rules that both a Kubernetes control plane and an etcd database application should not be installed on the same server in a service tier when the service tier has five or more servers, Therefore the Application Management Controller updates these affinities to indicate that the Kubernetes control plane and the etcd database application still have an affinity for servers with solid-state drives, and for the storage domain A, and adds a taint for each of the Kubernetes control plane and the etcd database application to not be installed on a server that has already installed the other application.

An affinity can be an attraction between computer components that causes them to enter into and remain in combination. A taint can be a repelling between computer components that causes them to avoid entering into and remaining in combination. A type can be a category of things having common characteristics. A current configuration can be the present arrangement or set-up of the hardware and software that make up a computer system. An identified affinity can be a discovered attraction between computer components that cause them to enter into and remain in combination.

Having updated affinities for the identified applications, the updated affinities for the identified applications are provided to the cluster database, which enables a master node to identify at least one replacement server for the identified applications and install the identified applications in the at least one replacement server, thereby enabling the at least one replacement server to substitute for the failed server and store data, block 2722. The system uses the affinities for halted applications to any server types, service tiers, and/or storage domains to restore the cluster's condition by installing the halted applications in the appropriate servers, service tiers, and/or storage domains. In embodiments, this can include the Application Management Controller using the API server to update these affinities in an active etcd database, which enables a master node, which detected the failure of the server 7, to read the active etcd database and identify the updated affinities for the Kubernetes control plane and the etcd database application. An updated affinity can be a revised attraction between computer components that causes them to enter into and remain in combination. A replacement server can be a computer which substitutes for a computer that executes computer programs which assist client devices in storing copies of data objects for retention within dedicated files.

Then the master node identifies server 13 as a replacement server for the failed server 7 since both servers 7 and 13 are in the service tier 2 for solid-state drives in the storage domain A. Additionally, the master node identifies server 14 as another replacement server for the failed server 7 since both servers 7 and 14 are in the service tier 2 for solid-state drives in the storage domain A, and because the taint between the Kubernetes control plane and the etcd database application will not tolerate both of these applications being installed on server 13. Therefore, this master node installs the Kubernetes control plane in the replacement server 13 and the etcd database application in the replacement server 14, thereby reestablishing the six service tiers specified by the three specifications for the storage domains A, B, and C, so that the replacement servers 13 and 14 store data in the service tier 2 in the storage domain A which were used by the failed server 7 for storing data.

The replacement server may be an existing server in the same service tier and the same storage domain as the failed server or a replacement server which is added to the same service tier and the same storage domain as the failed server after the failed server has failed. For example, if no server with solid-state drives in the storage domain A is currently available to replace the failed server 7, the master node can identify the existing server 8 as a replacement for the failed server 7 since both servers are in the service tier 2 for solid-state drives in the storage domain A, and then install the domain services application in the replacement server 8. Although the six service tiers specified by the three specifications for the storage domains A, B, and C, have yet to be reestablished, in a temporarily degraded state the existing server 8 can store its own data and the data that would have been stored by the failed server 7 in the service tier 2 in the storage domain A.

Providing the identified affinities may include providing the identified count to the cluster database which enables a master node to identify replacement servers for the identified applications, and install the identified count of the identified applications in the replacement servers, thereby enabling the replacement servers to substitute for the failed server and store data. For example, the Application Management Controller identifies that one of the two instances of the Kubernetes control plane that needs to be installed in the servers in storage domain A was installed in the failed server 7 in service tier 2, and that the only other instance of the Kubernetes control plane was installed in the only other service tier in storage domain A, which is service tier 1. Therefore, the Application Management Controller updates the affinity for the Kubernetes control plane by adding taints for every storage domain other than storage domain A and adding a taint for service tier 1, which the master node subsequently reads and uses to install an instance of the Kubernetes control plane in server 9 in the service tier 2.

Similarly, the Application Management Controller updates the affinity for the etcd database by adding taints for every storage domain other than storage domain A and adding a taint for service tier 1, which the master node subsequently reads and uses to install an instance of the etcd database in server 10 in the service tier 2. In contrast, the Application Management Controller does not update the affinity that the domain services application has for the storage domain A because after being installed in the failed server 7 in service tier 2 in storage domain A, the master node can equally effectively relocate this domain services application in either the replacement server 8 in the storage domain A or any server n storage domain A. An identified count can be a recognized total number of something.

Although FIG. 27 depicts the blocks 2702-2722 occurring in a specific order, the blocks 2702-2722 may occur in another order. In other implementations, each of the blocks 2702-2722 may also be executed in combination with other blocks and/or some blocks may be divided into a different set of blocks.

Figure 28:
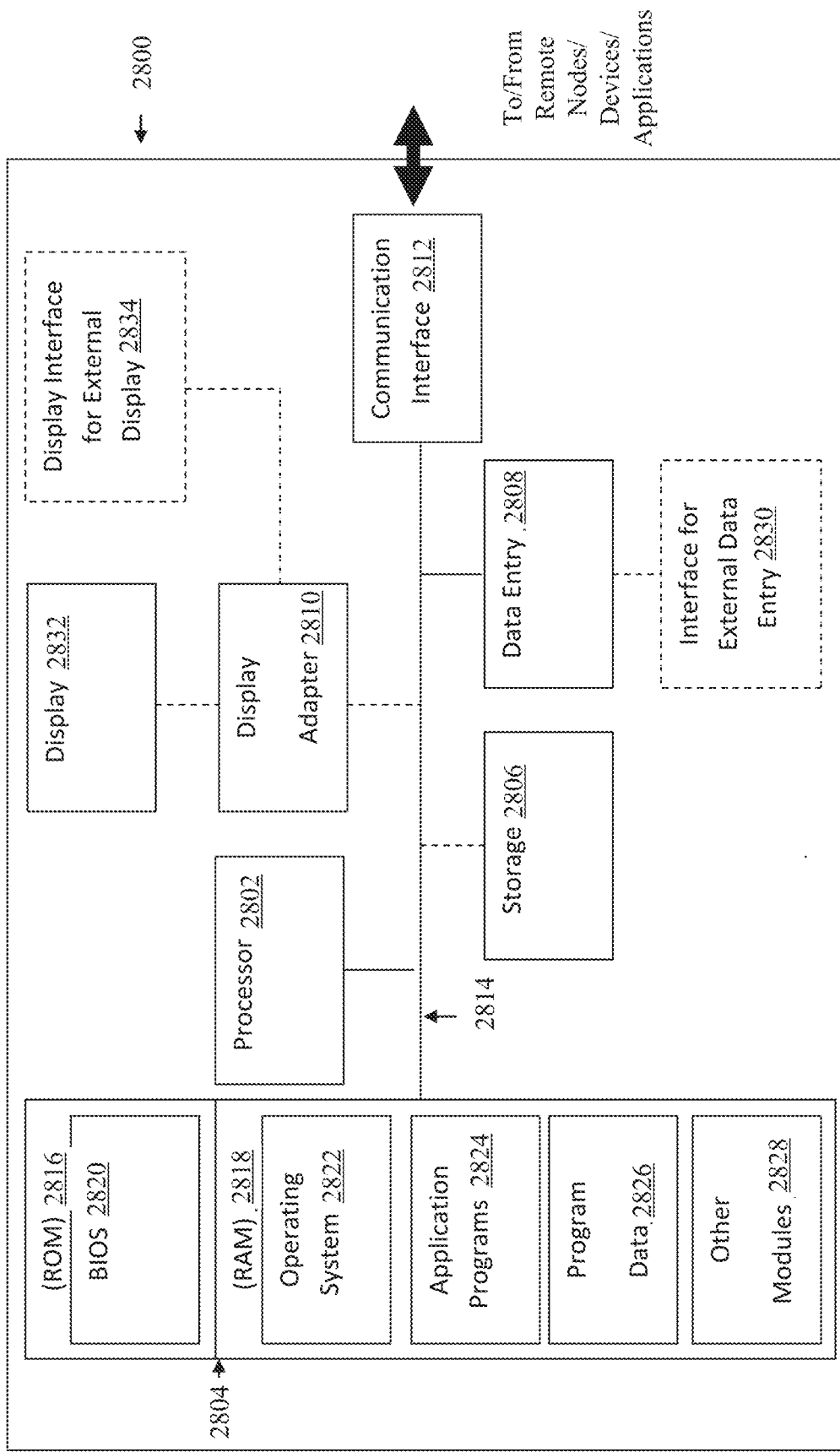
FIG. 28 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 28 may vary depending on the system implementation. With reference to FIG. 28, an exemplary system for implementing the subject matter disclosed herein includes a hardware device 2800, including a processing unit 2802, memory 2804, storage 2806, a data entry module 2808, a display adapter 2810, a communication interface 2812, and a bus 2814 that couples the elements 2804-2812 to the processing unit 2802.

The bus 2814 may comprise any type of bus architecture. Examples include a memory bus, a peripheral bus, a local bus, etc. The processing unit 2802 is an instruction execution machine, apparatus, or device and may comprise a microprocessor, a digital signal processor, a graphics processing unit, an application specific integrated circuit (ASIC), a field programmable gate array (FPGA), etc. The processing unit 2802 may be configured to execute program instructions stored in the memory 2804 and/or the storage 2806 and/or received via the data entry module 2808.

The memory 2804 may include read only memory (ROM) 2816 and random-access memory (RAM) 2818. The memory 2804 may be configured to store program instructions and data during operation of the hardware device 2800. In various embodiments, the memory 2804 may include any of a variety of memory technologies such as static random-access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example.

The memory 2804 may also include nonvolatile memory technologies such as nonvolatile flash RAM (NVRAM) or ROM. In some embodiments, it is contemplated that the memory 2804 may include a combination of technologies such as the foregoing, as well as other technologies not specifically mentioned. When the subject matter is implemented in a computer system, a basic input/output system (BIOS) 2820, containing the basic routines that help to transfer information between elements within the computer system, such as during start-up, is stored in the ROM 2816.

The storage 2806 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD, or other optical media. The drives and their associated computer-readable media provide nonvolatile storage of computer readable instructions, data structures, program modules and other data for the hardware device 2800. It is noted that the methods described herein may be embodied in executable instructions stored in a computer readable medium for use by or in connection with an instruction execution machine, apparatus, or device, such as a computer-based or processor-containing machine, apparatus, or device.

It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for conducting the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high-definition DVD (HD-DVD™), a BLU-RAY disc; and the like.

A number of program modules may be stored on the storage 2806, the ROM 2816 or the RAM 2818, including an operating system 2822, one or more applications programs 2824, program data 2826, and other program modules 2828. A user may enter commands and information into the hardware device 2800 through the data entry module 2808. The data entry module 2808 may include mechanisms such as a keyboard, a touch screen, a pointing device, etc. Other external input devices (not shown) are connected to the hardware device 2800 via an external data entry interface 2830.

By way of example and not limitation, external input devices may include a microphone, joystick, game pad, satellite dish, scanner, or the like. In some embodiments, external input devices may include video or audio input devices such as a video camera, a still camera, etc. The data entry module 2808 may be configured to receive input from one or more users of the hardware device 2800 and to deliver such input to the processing unit 2802 and/or the memory 2804 via the bus 2814.

A display 2832 is also connected to the bus 2814 via the display adapter 2810. The display 2832 may be configured to display output of the hardware device 2800 to one or more users. In some embodiments, a given device such as a touch screen, for example, may function as both the data entry module 2808 and the display 2832. External display devices may also be connected to the bus 2814 via an external display interface 2834. Other peripheral output devices, not shown, such as speakers and printers, may be connected to the hardware device 2800.

The hardware device 2800 may operate in a networked environment using logical connections to one or more remote nodes (not shown) via the communication interface 2812. The remote node may be another computer, a server, a router, a peer device, or other common network node, and typically includes many or all the elements described above relative to the hardware device 2800. The communication interface 2812 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network).

Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 2812 may include logic configured to support direct memory access (DMA) transfers between the memory 2804 and other devices.

In a networked environment, program modules depicted relative to the hardware device 2800, or portions thereof, may be stored in a remote storage device, such as, for example, on a server. It will be appreciated that other hardware and/or software to establish a communications link between the hardware device 2800 and other devices may be used.

The arrangement of the hardware device 2800 illustrated in FIG. 28 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of the hardware device 2800.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 28.

Other components may be implemented in software, hardware, or a combination of software and hardware. Moreover, some or all these other components may be combined, some may be omitted altogether, and additional components may be added while still achieving the functionality described herein. Thus, the subject matter described herein may be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation to encompass all such modifications and similar arrangements.

What is claimed is:

1. A system for a framework for managing the infrastructure for storage domains and service tiers, comprising:
   one or more processors; and
   a non-transitory computer readable medium storing a plurality of instructions, which when executed, cause the one or more processors to:
   detect a failed server in a cluster of servers, which are controlled by a master node to execute applications and store data, in service tiers, which correspond to sets of server performance characteristics, in storage domains, which correspond to server racks, in the cluster of servers;
identify, by accessing a cluster database application installed in a server in the cluster of servers via a secure HTTPS port in the server, applications installed on the failed server and any affinities, based on high availability strategies, that the identified applications have for at least one of any type of server, any of the service tiers, and any of the storage domains,
update, by accessing the cluster database application via the secure HTTPS port, based on a current configuration of the cluster, the identified affinities for the identified applications, and
enable, by providing the updated affinities for the identified applications in the cluster database application, the master node to identify at least one replacement server, for the identified applications, and install the identified applications in the at least one replacement server, thereby enabling the at least one replacement server to substitute for the failed server, store data, and improve on, high availability for the cluster.

2. The system of claim 1, wherein the plurality of instructions further causes the processor to:
allocate the servers for each of the service tiers in each of the storage domains in the cluster, in response to receiving specifications for creating storage domains which include service tiers;
create the cluster database application by installing a database application in at least three servers in the storage domains;
create the master nodes by installing a container control services application in at least two servers in the storage domains;
prepare the service tiers for operation by installing a tier services application in at least one server in each of the service tiers;
prepare the storage domains for operation by installing a domain services application in at least one server in each of the storage domains; and
combine each allocated server into the cluster of servers.

3. The system of claim 1, wherein the identified applications comprise at least one of the container control services application, the tier services application, the domain services application, and a database application.

4. The system of claim 1, wherein the replacement server comprises one of an existing server in a same service tier and a same storage domain as the failed server and a replacement server which is added to the same service tier and the same storage domain as the failed server after the failed server has failed.

5. The system of claim 1, wherein identifying any affinities comprises identifying a count for the identified applications based on at least one of a count of the storage domains, a count of the service tiers, and a high availability strategy.

6. The system of claim 5, wherein providing the identified affinities comprises providing the identified count to the cluster database application which enables the master node to identify replacement servers for the identified applications, and install the identified count of the identified applications in the replacement servers, thereby enabling the replacement servers to substitute for the failed server and store data.

7. The system of claim 1, wherein identifying any affinities further comprises identifying any taints that the identified applications have which repels at least one of any type of server, any of the service tiers, and any of the storage domains.

8. A computer-implemented method for framework for managing the infrastructure for storage domains and service tiers the computer-implemented method comprising:
detecting a failed server in a cluster of servers, which are controlled by a master node to execute applications and store data, in service tiers, which correspond to sets of server performance characteristics, in storage domains, which correspond to server racks, in the cluster of servers;
identifying, by accessing a cluster database application installed in a server in the cluster of servers via a secure HTTPS port in the server, applications installed on the failed server and any affinities, based on high availability strategies, that the identified applications have for at least one of any type of server, any of the service tiers, and any of the storage domains,
updating, by accessing the cluster database application via the secure HTTPS port, based on a current configuration of the cluster, the identified affinities for the identified applications; and
enabling, by providing the updated affinities for the identified applications in the cluster database application, the master node to identify at least one replacement server, for the identified applications, and install the identified applications in the at least one replacement server, thereby enabling the at least one replacement server to substitute for the failed server, store data, and improve on high availability for the cluster.

9. The computer-implemented method of claim 8, wherein the computer-implemented method further comprises:
allocating the servers for each of the service tiers in each of the storage domains in the cluster, in response to receiving specifications for creating storage domains which include service tiers;
creating the cluster database application by installing a database application in at least three servers in the storage domains;
creating the master nodes by installing a container control services application in at least two servers in the storage domains;
preparing the service tiers for operation by installing a tier services application in at least one server in each of the service tiers;
preparing the storage domains for operation by installing a domain services application in at least one server in each of the storage domains; and
combining each allocated server into the cluster of servers.

10. The computer-implemented method of claim 8, wherein the identified applications comprise at least one of the container control services application, the tier services application, the domain services application, and a database application.

11. The computer-implemented method of claim 8, wherein the replacement server comprises one of an existing server in a same service tier and a same storage domain as the failed server and a replacement server which is added to the same service tier and the same storage domain as the failed server after the failed server has failed.

12. The computer-implemented method of claim 8, wherein identifying any affinities comprises identifying a count for the identified applications based on at least one of a count of the storage domains, a count of the service tiers, and a high availability strategy.

13. The computer-implemented method of claim 12, wherein providing the identified affinities comprises providing the identified count to the cluster database application which enables the master node to identify replacement servers for the identified applications, and install the identified count of the identified applications in the replacement servers, thereby enabling the replacement servers to substitute for the failed server and store data.

14. The computer-implemented method of claim 8, wherein identifying any affinities further comprises identifying any taints that the identified applications have which repels at least one of any type of server, any of the service tiers, and any of the storage domains.

15. A computer program product, comprising a non-transitory computer-readable medium having a computer-readable program code embodied therein to be executed by one or more processors, the program code including instructions to:

detect a failed server in a cluster of servers, which are controlled by a master node to execute applications and store data, in service tiers, which correspond to sets of server performance characteristics, in storage domains, which correspond to server racks, in the cluster of servers;

identify, by accessing a cluster database application installed in a server in the cluster of servers via a secure HTTPS port in the server, applications installed on the failed server and any affinities, based on high availability strategies, that the identified applications have for at least one of any type of server, any of the service tiers, and any of the storage domains, update, by accessing the cluster database application via the secure HTTPS port, based on a current configuration of the cluster, the identified affinities for the identified applications; and enable, by providing the updated affinities for the identified applications in the cluster database application, one of the master nodes to identify at least one replacement server, for the identified applications, and install the identified applications in the at least one replacement server, thereby enabling the at least one replacement server to substitute for the failed server, store data, and improve on high availability for the cluster.

16. The computer program product of claim 15, wherein the program code includes further instructions to:

allocate the servers for each of the service tiers in each of the storage domains in the cluster, in response to receiving specifications for creating storage domains which include service tiers;

create the cluster database application by installing a database application in at least three servers in the storage domains;

create the master nodes by installing a container control services application in at least two servers in the storage domains;

prepare the service tiers for operation by installing a tier services application in at least one server in each of the service tiers;

prepare the storage domains for operation by installing a domain services application in at least one server in each of the storage domains; and combine each allocated server into the cluster of servers.

17. The computer program product of claim 15, wherein the identified applications comprise at least one of the container control services application, the tier services application, the domain services application, and a database application.

18. The computer program product of claim 15, wherein the replacement server comprises one of an existing server in a same service tier and a same storage domain as the failed server and a replacement server which is added to the same service tier and the same storage domain as the failed server after the failed server has failed.

19. The computer program product of claim 15, wherein identifying any affinities comprises identifying a count for the identified applications based on at least one of a count of the storage domains, a count of the service tiers, and a high availability strategy; and providing the identified affinities comprises providing the identified count to the cluster database application which enables the master node to identify replacement servers for the identified applications, and install the identified count of the identified applications in the replacement servers, thereby enabling the replacement servers to substitute for the failed server and store data.

20. The computer program product of claim 15, wherein identifying any affinities further comprises identifying any taints that the identified applications have which repels at least one of any type of server, any of the service tiers, and any of the storage domains.

* * * * *